(12) United States Patent
Hachiya et al.

(10) Patent No.: US 11,086,496 B2
(45) Date of Patent: Aug. 10, 2021

(54) APPROACH FOR SELECTING A DESIRED OBJECT ON A SMALL TOUCH SCREEN

(71) Applicant: INTERNATIONAL BUSINESS MACHINES CORPORATION, Armonk, NY (US)

(72) Inventors: Shuichi Hachiya, Kanagawa (JP); Mariko Ishige, Tokyo (JP); Yasuko Hidaka, Tokyo (JP); Shigetoshi Nogami, Kanagawaken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/746,417

(22) Filed: Jan. 17, 2020

(65) Prior Publication Data
US 2020/0150854 A1    May 14, 2020

Related U.S. Application Data

(63) Continuation of application No. 14/885,744, filed on Oct. 16, 2015, now Pat. No. 10,599,305.

(51) Int. Cl.
*G06F 3/0484* (2013.01)
*G06F 3/0488* (2013.01)
*G06F 3/0481* (2013.01)
*G06F 3/0482* (2013.01)

(52) U.S. Cl.
CPC ........ *G06F 3/04842* (2013.01); *G06F 3/0482* (2013.01); *G06F 3/04817* (2013.01); *G06F 3/04845* (2013.01); *G06F 3/04883* (2013.01)

(58) Field of Classification Search
CPC ............. G06F 3/04842; G06F 3/04845; G06F 3/04883; G06F 3/04817; G06F 3/0482
See application file for complete search history.

(56) References Cited

U.S. PATENT DOCUMENTS

| 6,211,856 B1 | 4/2001 | Choi et al. |
| 7,818,672 B2 | 10/2010 | McCormack et al. |
| 2007/0011623 A1* | 1/2007 | Billmaier ............. H04N 21/482 715/784 |
| 2010/0066690 A1* | 3/2010 | Beamish .................. G09B 7/06 345/173 |

(Continued)

FOREIGN PATENT DOCUMENTS

JP    2010198433    9/2010

OTHER PUBLICATIONS

List of IBM Patents or Patent Applications Treated as Related dated Jan. 17, 2020, 2 pages.

*Primary Examiner* — Seth A Silverman
(74) *Attorney, Agent, or Firm* — Tutunjian & Bitetto, P.C.; Erik Johnson

(57) ABSTRACT

An approach to selecting an object represented on a touch screen display includes displaying a plurality of independent digital images on the touch screen display, indicating one of the plurality of independent digital images is selectable, detecting if interaction with the touch screen display is made while one of the plurality of independent digital images is indicated as selectable, and if interaction with the touch screen display is not made while the one of the plurality of independent digital images is indicated as selectable, indicating a subsequent digital image is selectable.

17 Claims, 24 Drawing Sheets

(56) References Cited

U.S. PATENT DOCUMENTS

| | | | |
|---|---|---|---|
| 2010/0123724 A1* | 5/2010 | Moore | G06F 3/04883 |
| | | | 345/473 |
| 2013/0085866 A1 | 4/2013 | Levitis et al. | |
| 2013/0339219 A1* | 12/2013 | Bernheimer | G06Q 40/025 |
| | | | 705/38 |
| 2016/0378811 A1* | 12/2016 | Kapoor | G06F 16/2282 |
| | | | 707/741 |

* cited by examiner

APPROACH FOR SELECTING A DESIRED OBJECT ON A SMALL TOUCH SCREEN

BACKGROUND

Technical Field

The present invention relates to an approach for selecting objects displayed on a touch screen, and more particularly to facilitating manual selection of a point on a small touch screen by a user.

Description of the Related Art

Touch screen displays in which a user may perform various operations or identify particular displayed images by making physical contact with the screen surface have become common. These touch screens may be used in consumer electronics, such as smart phones and smart watches to simplify the functioning of the device, and make the device more appealing and user-friendly.

Touch screens may utilize optical (e.g., infrared), electrical (e.g., capacitive, resistive, electric field), acoustic (e.g., ultrasonic surface waves), and/or thermal means of detecting where on the surface of the screen contact has been made.

The touch resolution for identifying a specific contact point on a touch screen can depend on the underlying technology of the touch screen, and may be, for example, in the range of about 25×40 to about 256×256 or about 1000×1000. The touch resolution of the touch screen can affect the pointing precision and thereby the error in selection. In addition, parallax error in the user's view of the displayed images can result in selection error.

The size of the touch screen may be adapted to the particular device, and in some instances may be so small that identifying a specific displayed image or icon becomes difficult for users. One problem of maintaining a suitable size without introducing difficulties in utilizing the functionality of these devices because of difficulties in selecting from among the various displayed digital images can arise. As screen size and/or image size of icons on various devices become smaller, it becomes more difficult to identify with specificity which icon a user desires to select.

SUMMARY

Principles and embodiments of the present disclosure relate to a method of facilitating selection of an object represented on a touch screen display.

One embodiment includes displaying a plurality of independent digital images on the touch screen display, wherein the touch screen display is responsive to interaction with the touch screen. One of the plurality of independent digital images is indicated as selectable. Interaction with the touch screen display made while the one of the plurality of independent digital images is indicated as selectable is detected. If interaction with the touch screen display is not made while the one of the plurality of independent digital images is indicated as selectable, a subsequent digital image is indicated as selectable.

One embodiment includes a touch screen display configured to display digital images, and detect a user's interaction with the screen. An indicator is associated with one of a plurality of digital images displayed on the touch screen display, wherein interaction with the touch screen display is detected as selection of the one of the plurality of digital images associated with the indicator.

Embodiments of the computer readable program when executed on a computer causes the computer to display a plurality of independent digital images on a touch screen display, wherein the touch screen display is responsive to contact with the touch screen display; indicate one of the plurality of independent digital images is selectable; detect if an interaction with the touch screen is made while the one of the plurality of independent digital images is selectable; and if the interaction with the touch screen is not made while the one of the plurality of independent digital images is indicated as selectable, indicate a subsequent digital image is selectable.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
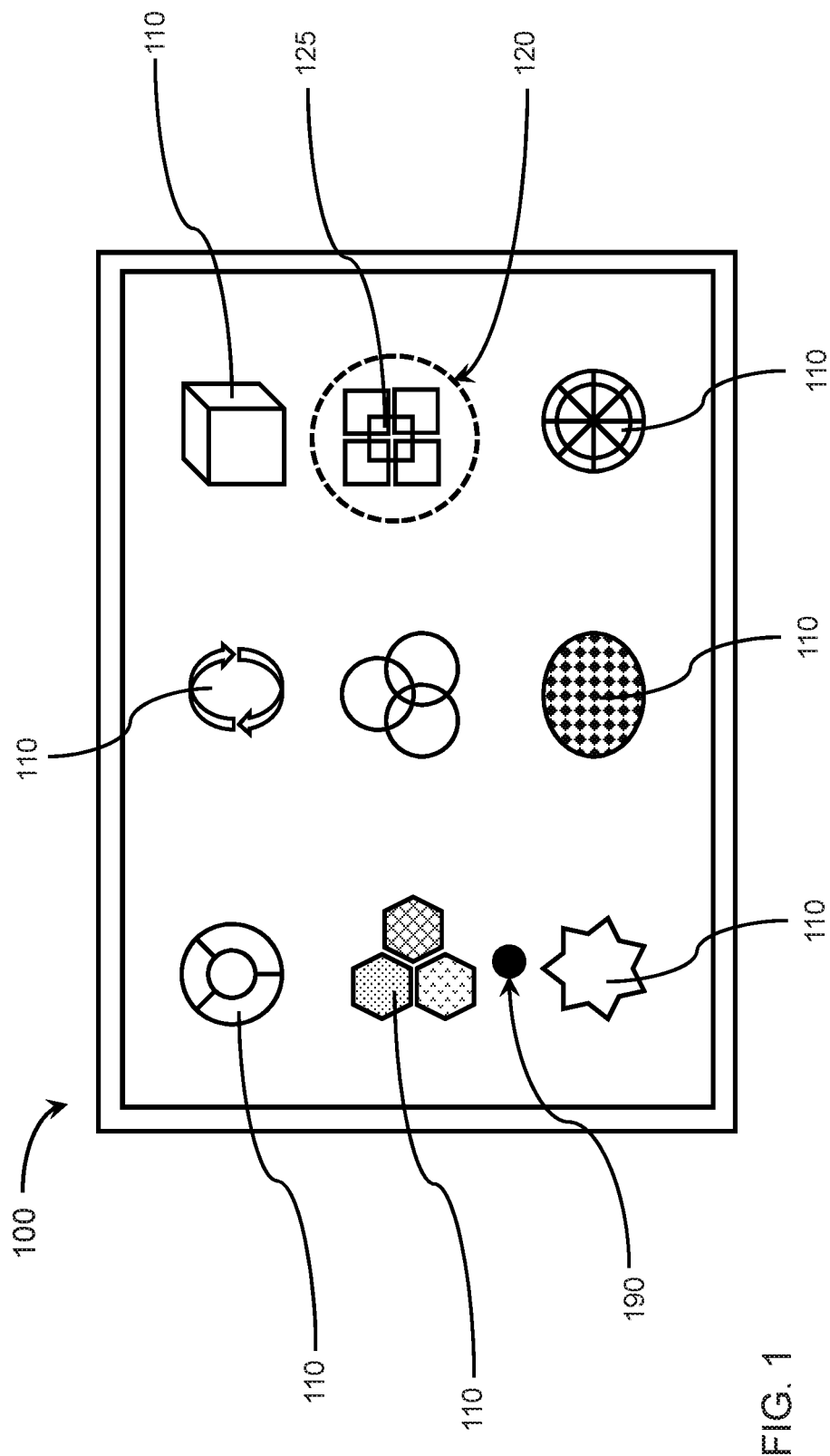
FIG. 1 is a touch screen display presenting a plurality of selectable objects represented by digital images in accordance with an illustrative embodiment.

Principles and embodiments of the present disclosure also relate to a system for facilitating selecting an object represented on a touch screen display.

Principles and embodiments of the present disclosure relate generally to methods of facilitating selection of objects presented on a display, and systems to implement the methods for selecting an object presented on a display.

Principles and embodiments of the present disclosure also can relate generally to a system configured to reduce errors in identification of a selected object represented by a digital image on a touch screen. An aspect of the disclosure relates to a system configured to facilitate the selection of objects presented on a display operatively associated with the system and with hardware and or software configured to perform the methods and algorithms. Principles and embodiments of the present disclosure also relate generally to decoupling the selection of a displayed digital image from the position of the click (contact point).

In various embodiments, a display may be a touch screen display (also referred to herein as a touch screen, screen, or display) that is configured to display images (e.g., text, icons, pictures, etc.), recognize an interaction by a user with the screen, and in particular, to detect the location and in some embodiments the pressure exerted at a contact point location. One or more selectable objects may be represented by digital images displayed on the touch screen at the same time, where each of the digital images may be a distinct icon that is a graphical representation of the object. A user may identify or select an object on the touch screen by making contact with the touch screen at a contact point overlapping or in the vicinity of a particular digital image. In various embodiments, interaction with the touch screen may involve physical contact by the user or with a pointing device (i.e., stylus) or through sufficient proximity with the touch screen to generate and be recognized as a contact point. It should be understood that reference to contact is not limited to physical contact, and can include sufficient proximity to the touch screen surface to detect an interaction, for example with field effect or projected capacitance touch screens.

In various embodiments, the touch screen display may be operatively associated with hardware, including but not limited to a processor and memory, and software including but not limited to an operating system, firmware, and software, that causes digital images to be displayed on the touch screen, detects contact with the touch screen, and executes the objects represented by the digital images to produce changes and results.

In some instances, the touch screen may be small (e.g., a smart watch), such that the surface area of the contact point, for example a person's fingertip, is larger than the size of the digital image, or the user may make contact with the touch screen closer to an unintended image than to the intended image. The digital images may also be located too close to each other on a small screen for a user to easily select one image over another, or for a device utilizing a small touch screen to recognize the correct digital image being selected. Since some electronic devices, like a smart watch, have a small touch screen, there is a possibility that a user may accidently indicate the wrong digital image being displayed when intending to select an object. For example, when a user clicks a position between digital images on a display, the particular image the user intends to select may be ambiguous, a device may interpret the selection as pertaining to the image located closest to the clicked position (e.g., contact point).

If a user uses two fingertips on a small screen to perform a zoom-in operation, the fingers may hide large portions of the screen, and images can be lost when a different portion of the screen is enlarged through the operation. The zoom-in operation may also be restricted to central portions of the screen where a user can form two contact points, so information at the edges may be obscured or lost. The amount of information available on the screen may thereby be reduced or lost.

Various embodiments relate generally to the systems and methods of differentiating between intended and unintended selection of the objects on the display screen, and assisting a user to select the intended object. Selection of an unintended object may be avoided by presenting an indicator distinguishing a currently selectable object from non-selectable objects represented on the display. An indicator may be associated with one of a plurality of digital images displayed on the touch screen display to indicate selectability. The indicator may include a separate digital image represented as a floating icon on the display, or a change in a characteristic of a digital image. In various embodiments, the indicator may be associated with one or more of a plurality of digital images displayed on the touch screen display, and indicating one of the plurality of independent digital images is selectable. An indicator may facilitate selection without obscuring or losing information on the touch screen display. Since an indicator indicates the selectability of an object without requiring a user to zoom-in, all of the digital images remain on the screen and unobscured, so a user has access to all the information present on the screen.

In one or more embodiments, a floating icon different from the icons representing the selectable objects may be displayed on the touch screen. The floating icon may move from the vicinity of an object icon to the vicinity of a different icon at set intervals. The floating icon may move automatically, where the movement may be visibly shown on the touch screen, or the floating icon may be redisplayed at a different location of the touch screen. A processor may control the display of the digital images and/or the floating icon. In other embodiments, the floating icon my move in response to user input.

In one or more embodiments, each of the one or more displayed object icons may be identified as selectable by separately altering characteristics, features, and/or positions of the digital images. The characteristics of the digital images may include, but not be limited to, size, color, shadowing, transparency, position, and/or motion. In various embodiments, one or more of the digital images being displayed on the touch screen may automatically change position on the touch screen, where the change in position may produce an effect of vibrating, moving around a fixed point, or moving along a path or in a pattern.

Principles and embodiments of the present disclosure also generally relate to a set of computer readable instruction stored on a non-transitory computer readable medium, where the instructions may comprise computer code written in one or more computer programming languages and configured to execute on a processor and implement the various embodiments of the systems and methods encompassed by the scope of the claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for an integrated circuit chip, which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The end product can be any product that includes a touch screen display and integrated circuit chips, ranging from toys and other low-end applications to advanced computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

One or more embodiments may include displaying a set of digital images on a touch screen at the same time; identifying a contact point on the touch screen, where the contact point may be designated by a user; identifying a subset of the digital images from the set of all presently displayed images based on the vicinity of a displayed image from the identified contact point; and presenting the subset of digital images to the user for subsequent selection.

When there are a plurality of images in the vicinity of the contact point, the closest image may be identified as selected, even if this was not the intended image, thereby requiring the user to undo the incorrect selection and re-entering a new choice, which delays proper use of the device and inconveniences the user.

One or more embodiments, may include providing a plurality of digital images for selection on a touch screen without reducing the number of digital images being displayed.

In various embodiments, the vicinity of each displayed image in the set of digital images to the contact point may be evaluated, and the set of digital images presently being displayed may be hierarchically ranked based on the distance from the contact point to the digital images. The set of displayed images may be correlated with an object (e.g., an application, a hyperlink, data, a file, a function, a subroutine, etc.), where selection of an image may initiate the execution of the application, transfer between applications, following of the hyperlink, accessing data, opening a file, etc. In various embodiments, the digital images may be icons, for example representing different application programs, text or data files; text, for example representing hyperlinks; text boxes, for example representing input fields; check boxes, radio buttons, etc., for example representing functions, inputs, or subroutines within an application, etc.

In one or more embodiments, the objects correlated with each of the displayed digital images in the set or subset may be extracted and presented as a list to a user for subsequent selection. The extracted objects may be evaluated based on one or more properties of each object. The evaluated objects may be ranked according to the evaluation results before being displayed as a list or subset. For example, objects that are applications may be ranked higher that hyperlinks. The order that objects are listed may be based on the past frequency of use or usage history (e.g., last used first, most used in previous time period first, etc.).

In one or more embodiments, the digital image or correlated object ranking highest in the hierarchy may be placed in a tentatively or temporarily selected condition.

Referring now to the drawings in which like numerals represent the same or similar elements, FIG. 1 illustrates an embodiment having a touch screen display 100 presenting a plurality of selectable objects represented by digital images 110 at the same time. The plurality of selectable objects can be part of a graphical user interface (GUI). A floating icon 120 identifies an object to be selected 125. Receiving a command from a user to select the identified object may involve interacting with the touch screen, for example by touching the screen, where a touch point 190 is depicted on a different portion of the display than the floating icon 120. The floating icon 120 may be any size or shape, as long as it can be recognized as the floating icon by a user. The floating icon 120 in FIG. 1 is depicted as a dashed circle surrounding the object to be selected 125, but this is for illustrative purposes only and should not be interpreted as a limitation. A floating icon 120 may be presented as an arrow, cross-hairs, a star, a polygon, or any other shape that may be recognizable and distinguishable from the digital image(s) being displayed. Depending on the size and/or shape of the floating icon 120, the floating icon may be located next to, around, overlapping, or otherwise associated with a digital image 110 to be understood by a user that the particular digital image is the object to be selected 125.

In various embodiments, a floating icon 120 may move smoothly across the display at a steady speed from one digital image to the next. The speed may be adjustable by a user, or based on the number of images displayed. In other embodiments, floating icon 120 may appear to intermittently 'jump' from one digital image 110 to another. The floating icon 120 may move sequentially between the digital images 110. The movement of the floating icon 120 may be in a direction from a digital image to a subsequent digital image to the right of the previous digital image. The movement of the floating icon 120 may be in a direction from a digital image to a subsequent digital image above or below the previous digital image. In various embodiments, the floating icon may move randomly over the whole touch screen. The apparent random movement between digital images 110 may be based on the frequency or probability that the image is selected.

The speed of the floating icon may be constant or may vary. In various embodiments, the speed of the floating icon may vary based on a predetermined likelihood of the object associate with the displayed digital image being selected, for example based on the ranking of the object in a previously determined hierarchy.

In various embodiments, the floating icon 120 does not have to initially be associated with a digital image located in an upper left-hand portion of the display. The floating icon 120 may initially be associated with an object determined to be the most selected, for example, a person that primarily uses a device such as a smart phone or smart watch to text may have the texting application initially identified as the object to be selected 125. In various embodiments, the floating icon may then move or transfer to and be associate with the next-most selected object, for example a social media application, and then to the next-most selected object, for example a game, etc., where the floating icon may transfer from one digital image to the next at regular intervals. In various embodiments the frequency and/or probability may be calculated by a processor and stored in memory.

In other embodiments, a floating icon 120 may remain associated with an object for a duration based on a ratio or percentage that the object is selected. The order and/or duration that objects are indicated as being selectable may be based on the past frequency of use or usage history. In various embodiments in which the floating icon 120 visually moves across the touch screen display, the floating icon 120 may move slowly when in the vicinity of the digital image for a more selected object, and more quickly when in the vicinity of the digital image for a less selected object, as determined by ratios or percentages of selection, for example from data stored in an icon selection history table.

The object presently associated with the floating icon would be selected, and the application or function executed, the hyperlink followed, etc., in response to a contact point being generated at any location on the touch screen.

In various embodiments in which a floating icon 120 transfers from one digital image 110 to a different digital image 110 on a touch screen display 100, initiating contact with the touch screen to generate a contact point 190 may be recognized as selecting the digital image 125 currently associated with the floating icon 120. When a floating icon 120 is present on the touch screen, the contact point does not have to be generated in the vicinity of the intended image. Any generation of a contact point 190 detected on the touch screen can be interpreted as an identification of the object to be selected 125. Determination that a contact point has been generated at any location of the touch screen can be considered sufficient, therefore a user does not have to obscure the location of interest by attempting to click on the particular image.

In various embodiments, object selection may be performed without reducing the number of digital images present on the touch screen display. The total amount of information being presented to a user may be maintained.

Figure 2:
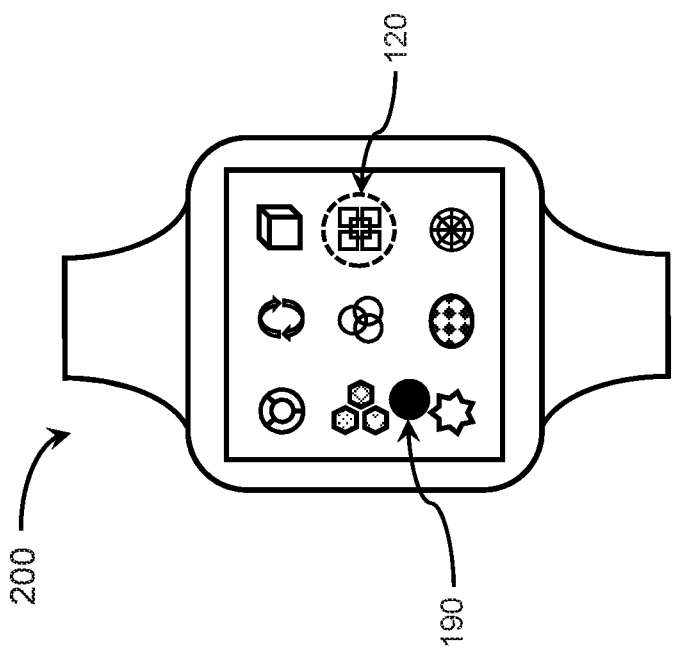
FIG. 2 is a smart watch having a small touch screen in accordance with an illustrative embodiment.

Referring to FIG. 2, an embodiment relating to a smart watch having a small touch screen is shown.

In various embodiments, a small touch screen display may be incorporated into a smart watch 200. A small touch screen display may have dimensions in the range of about 32 mm to about 140 mm, or about 33 mm to about 120 mm, or about 33 mm to about 51 mm across the diagonal. Other dimensions may also be employed. In various embodiments, a touch screen may be characterized as small when digital images representing objects occupy a screen area less than the average surface area of a contact point generated by a fingertip, or the space between digital images are less than the average surface area of a contact point generated by a fingertip.

Figure 3:
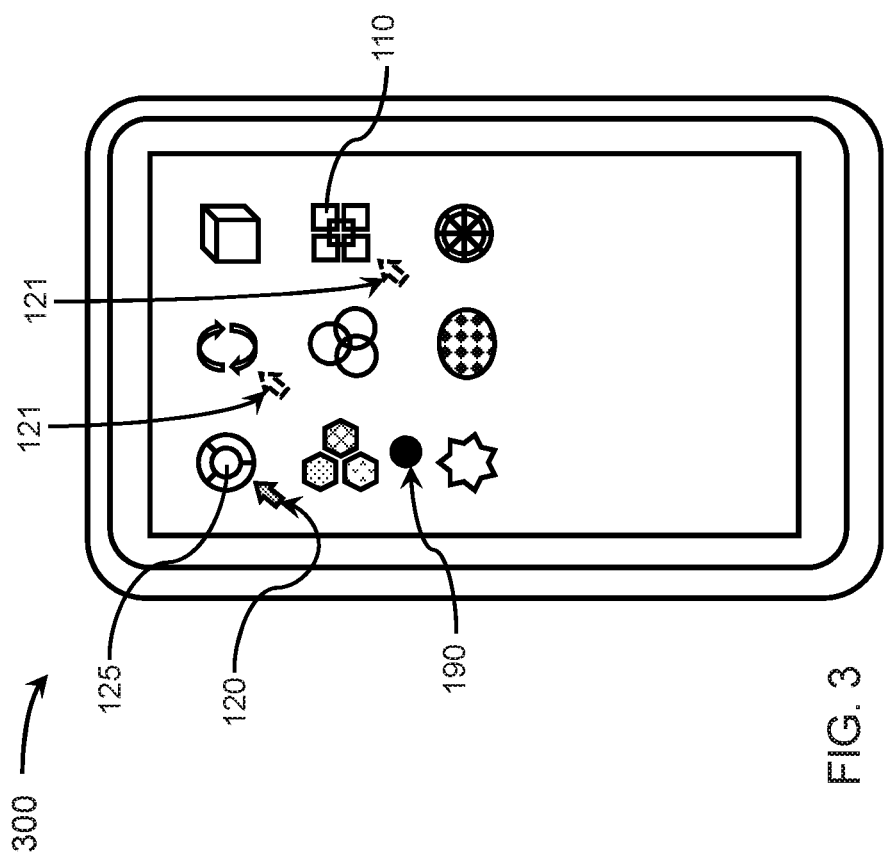
FIG. 3 is a smart phone having a small touch screen in accordance with an illustrative embodiment.

Referring to FIG. 3, an embodiment relating to a smart phone having a small touch screen is shown. In various embodiments, a small touch screen display may be incorporated into a smart phone 300. In various embodiments, the floating icon 120 may have different shapes that may be displayed on the touch screen adjacent, around, or over a digital image representing an object to be selected 125. The floating icon may be displayed in a similar relative position 121 for each image to indicate association with subsequent object(s) available for selection.

While certain embodiments are illustrated as being implemented on a smart watch and other embodiments may be illustrated as being implemented on a smart phone, this should not be construed as a limitation, as any of the embodiments may be implemented on any device comprising a touch screen.

Figure 4:
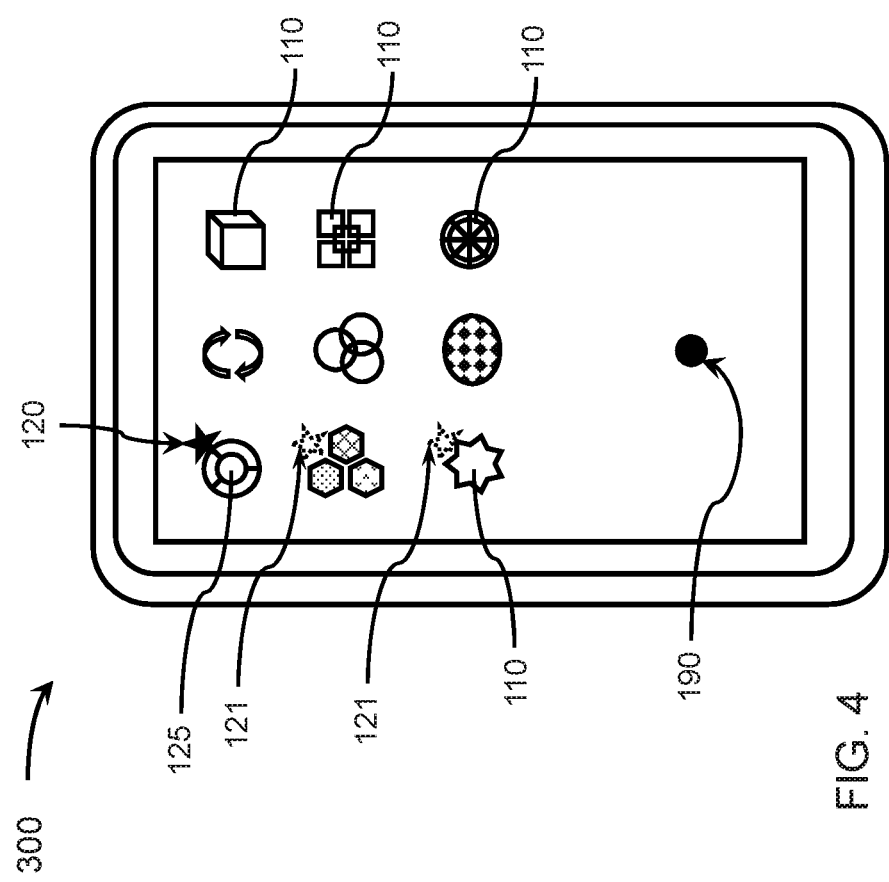
FIG. 4 is a smart phone having a small touch screen display, and a set of digital images displayed on the small touch screen display in accordance with an illustrative embodiment.

Referring to FIG. 4, an embodiment of a smart phone displaying a set of digital images on a small touch screen display is shown.

In one or more embodiments, a floating icon 120 shown as a star is displayed adjacent to a selectable object 125. The floating icon may transfer from a position adjacent one digital image to a position 121 adjacent a different digital image 110, where the transfer between digital images may be in a sequential manner across the rows or down the columns. The currently indicated digital image 125 may be selected by generating a contact point 190 anywhere on the touch screen.

Figure 5:
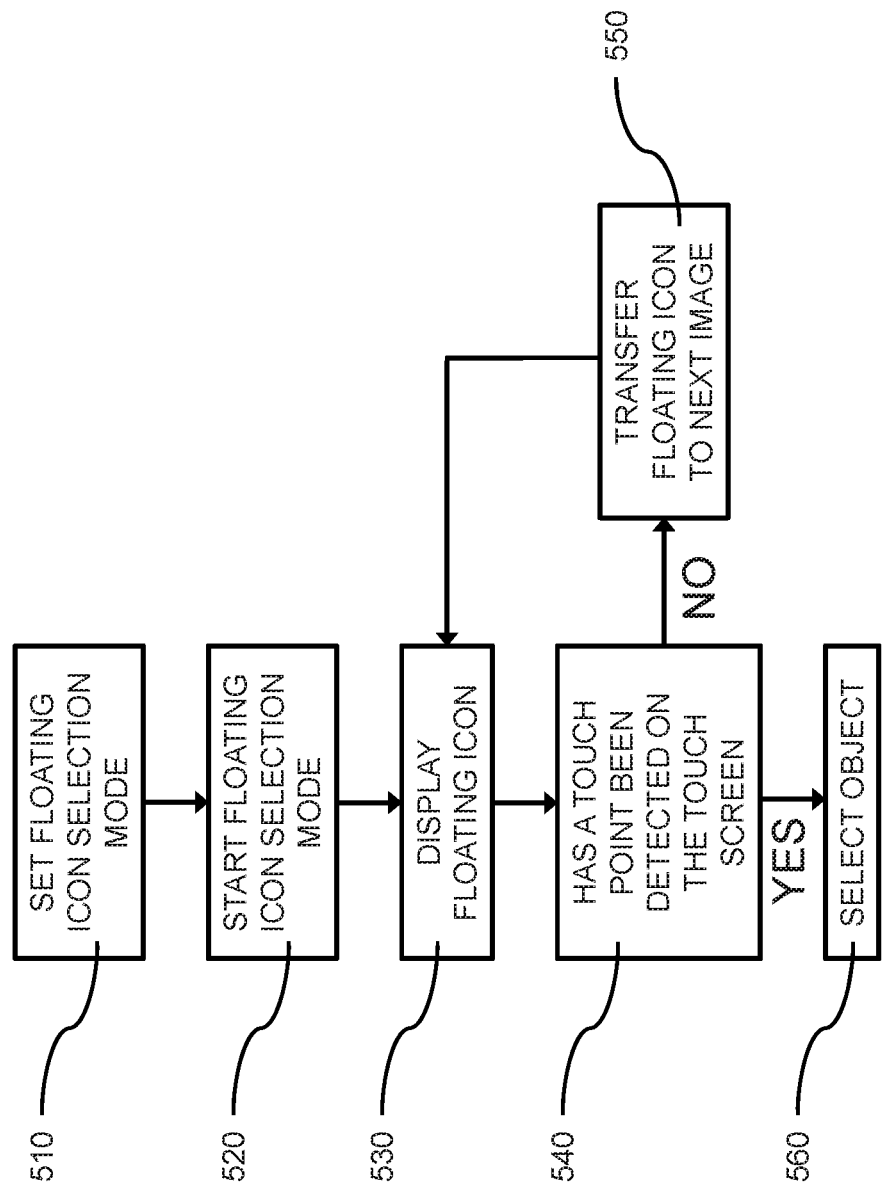
FIG. 5 is a block/flow diagram illustrating an embodiment in which an indicator represented by a floating icon is displayed on a touch screen.

Referring to FIG. 5, a block/flow diagram illustrates an embodiment in which an indicator represented by a floating icon is displayed on a touch screen.

In block 510, a user may set a device having a touch screen in a floating icon selection mode to activate a module configured to display and move a floating icon, and detect selections on the touch screen. Setting the floating icon selection mode may involve choosing between an indicator utilizing a floating icon and an indicator utilizing a change in a characteristic of the digital image. Setting the floating icon selection mode may include choosing a floating icon from a set of floating icons hardwired into the integrated circuitry or stored in memory, choosing a transfer mode for the floating icon (e.g., smooth motion, jumping, etc.), choosing a set or variable speed (e.g., constant speed or speed based on selection probability or frequency), choosing whether the floating icon transfers between digital images sequentially based on their display order, or intermittently based on their selection probability or frequency, and/or setting the amount of time a floating icon remains associated with a digital image.

In block 520, the floating icon module is initiated, and program code relating to the floating icon is executed. Other variable are also contemplated and may be set in floating icon selection mode.

In block 530, a floating icon is associated with a displayed digital image, where the floating icon may have been selected when setting the floating icon selection mode, and may be displayed adjacent, around, or over a digital image.

In block 540, the module initiates detecting an interaction that indicates selection of an object associated with a particular digital image at the time of the interaction. Generation of a contact point on the touch screen may be detected, and functions of the module executed based on position and/or time of the detected contact.

In block 550, if an interaction has not been detected, the floating icon may remain associated with a digital image for a predetermined amount of time and then associate with a different digital image. The floating icon may be shown as moving across the display to another digital image, or the floating icon may vanish from its original position and appear in a new position (i.e., jump).

In block 560, if an interaction has been detected, the object may be activated, and display of the floating icon may be discontinued.

Figure 6:
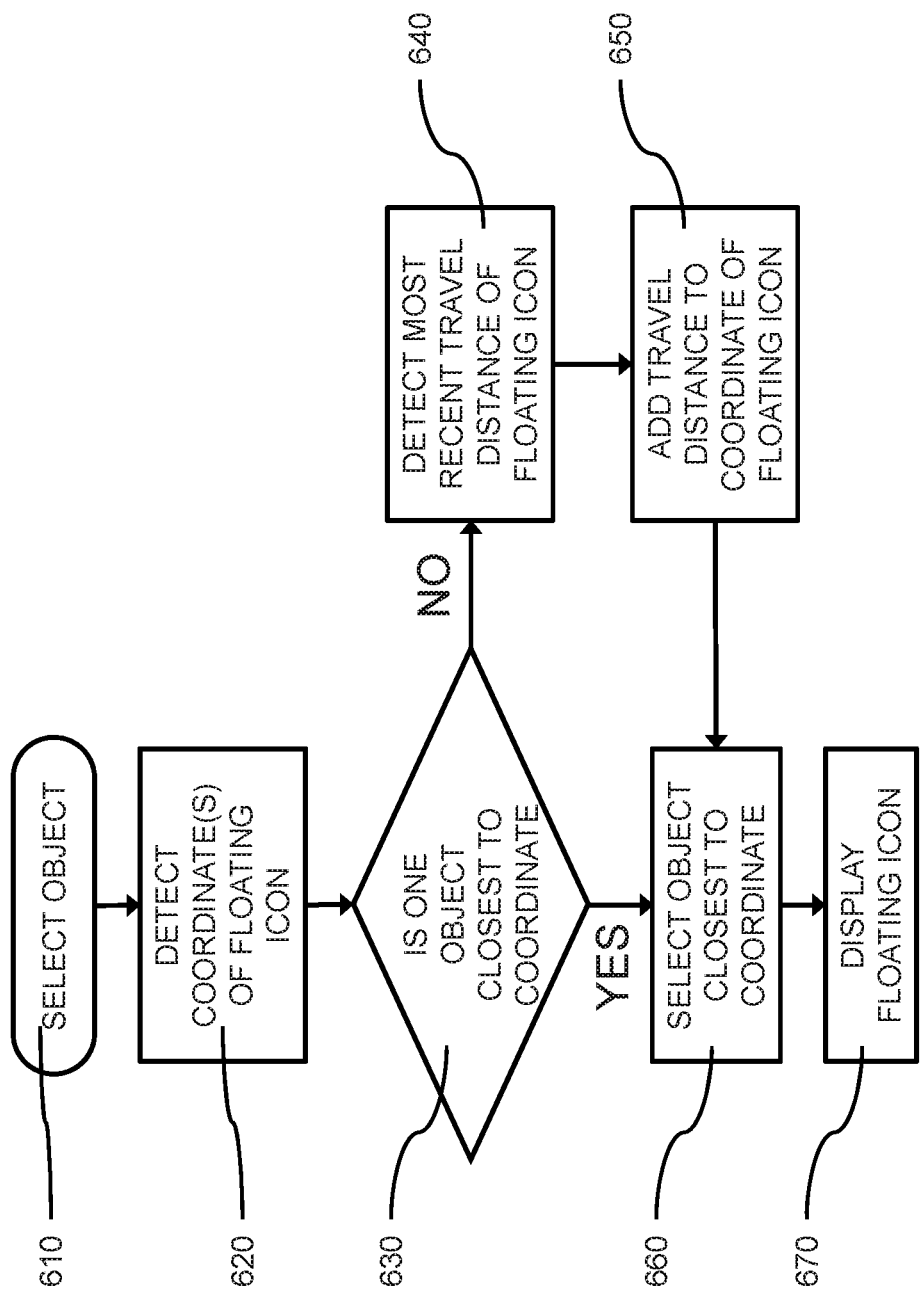
FIG. 6 depicts a block/flow diagram illustrating an embodiment in which the position of a floating icon is identified by its display position on a touch screen.

Referring to FIG. 6, a block/flow diagram illustrates an embodiment in which the position of a floating icon is identified by its display position on a touch screen.

In block 610, a user initiates selection of an object corresponding to a displayed digital image. Selection may be indicated by interacting through contact with the touch screen display. A processor may detect interaction with the touch screen and execute stored computer code in response to a selection, where the computer code may be stored in memory coupled to the processor. Detection of a contact point by a processor may initiate the execution of an application, transfer between applications, following of a hyperlink, accessing data, opening a file, etc., by the processor.

In block 620, the coordinate(s) of the floating icon may be determined. The coordinates may be stored and/or compared with the coordinates of the digital images displayed on the touch screen. The coordinates may be calculated or stored in a lookup table. The comparison of the coordinates may be done by the processor, and may involve calculating the location of the floating icon and/or digital images, and/or accessing stored coordinates of the digital images in a look up table stored in memory. The coordinate or coordinates of the floating icon and/or digital images may be represented and stored as X-Y coordinates, vector coordinates from an origin, or as other coordinates known in the art. The display position of the floating icon 120 may be relative to the screen positions of the digital images or to an origin.

In block 630, whether one digital image is closest to the coordinates of the floating icon is determined. In embodiments in which the floating icon is depicted as moving across the touch screen, a user may indicate a selection when the floating icon is in a space between two or more digital images. A determination of which digital image the floating icon is associated with may have to be determined.

In block 640, if a determination of the closest digital image cannot be made based on the coordinates of the floating icon and the one or more digital images, the direction of motion of the floating icon may be determined. A digital image along the path of motion of the floating icon may be weighted more heavily than a digital image already passed by the floating icon. The travel distance of the floating icon may be determined.

In block 650, a travel distance may be added to the coordinates of the floating icon to provide a displacement from an initial coordinate. A digital image closer to the floating icon after addition of a travel distance may be identified as selected.

In block 660, if a determination of the closest digital image can be made based on the coordinates of the floating icon and the one or more digital images, the corresponding object relating to the selected digital image may be activated, and display of the floating icon may be discontinued.

In block 670, a floating icon may be displayed on the touch screen after a previous object has been executed. A process of transferring a floating icon between displayed digital images indicating available objects may be re-started.

Figure 7:
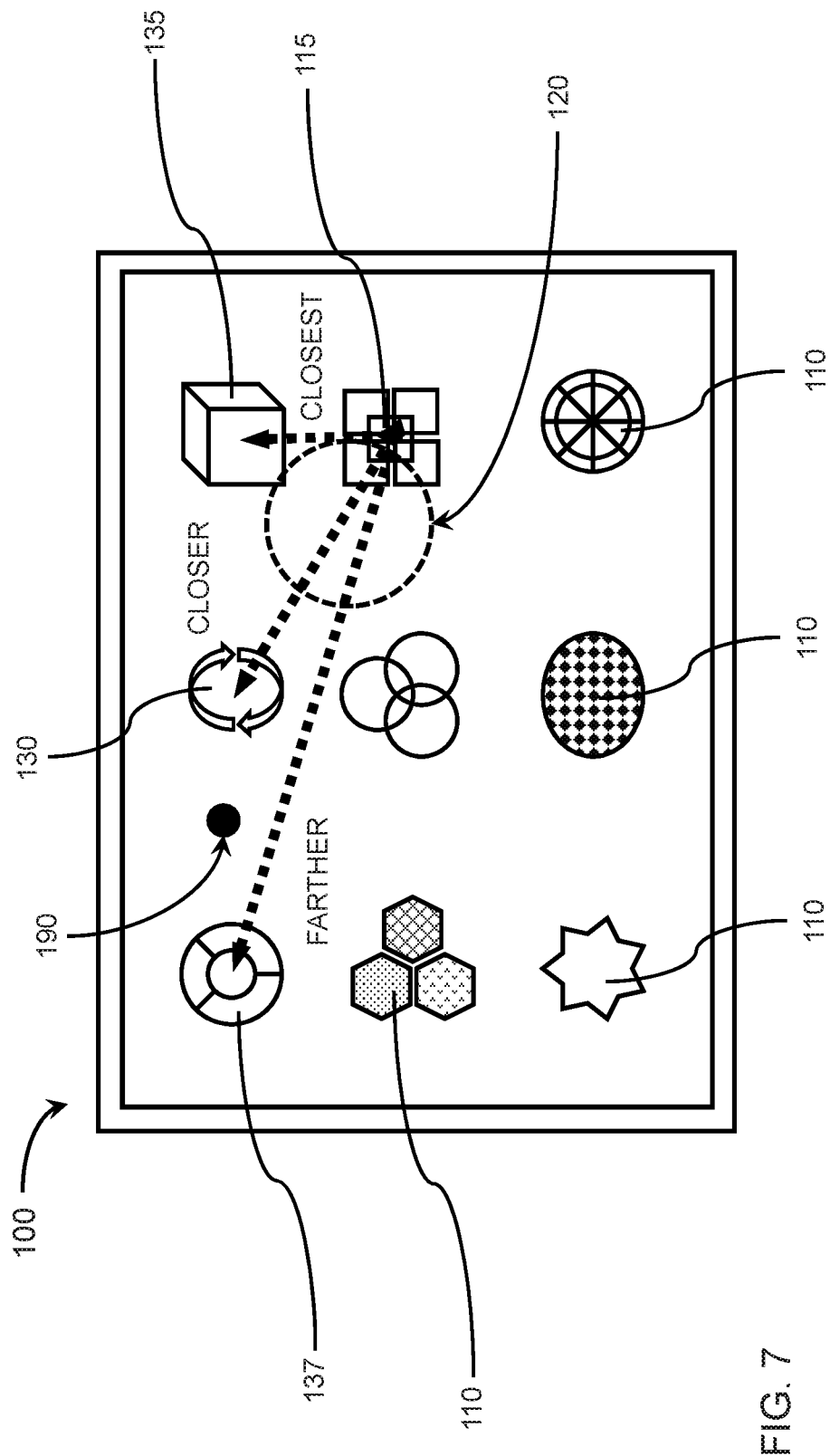
FIG. 7 is a touch screen display presenting a plurality of selectable objects represented by digital images at the same time in accordance with an illustrative embodiment.

Referring to FIG. 7, an embodiment having a touch screen display 100 presenting a plurality of selectable objects represented by digital images 110 at the same time is shown. A floating icon 120 is shown moving from a previously indicated digital image 115 to a subsequent digital image 130, which will be indicated as selectable 125. The floating icon 120 may move along a predetermined path from the initial digital image 115 to the subsequent digital image 130. During a period of the floating icon's movement, the floating icon 120 may be located in the space between a number of digital images 110, at which time the digital image to be selected may be ambiguous. The floating icon's direction of travel may be used to determine the intended digital image 110 to be identified as selectable.

In various embodiments, a floating icon 120 may initially be associated with a digital image which is most likely to be selected. The floating icon 120 may then proceed to associate with another digital image that is the next most likely to be selected. In various embodiments, the floating icon 120 may move automatically and randomly over the whole screen.

When a user clicks a position and the floating icon 120 is between objects, determination of which of the objects the user is selecting can be ambiguous. In various embodiments, a traveling direction of the floating icon 120 may be taken into account. In an embodiments, a digital image 135 located closest to the center of the floating icon 120, other than the digital image that the floating icon just left, may be identified as selected when a contact point 190 is detected. In another embodiments, the subsequent digital image 130 that the floating icon 120 is moving towards may not be the closest digital image. The floating icon's direction of travel may be taken into account, and the subsequent digital image 130 on the floating icon's path may be identified as selected when a contact point 190 is detected. Similarly, when there are a plurality of digital images 110 closest to the center of the floating icon 120, and the floating icon's path is not clear, the object closer to the center of the floating icon 120 and the contact point 190 may be identified as selected, rather than an object 137 close to the contact point 190 but farther from the center of the floating icon 120. The floating icon may be used as a reference point to determine which digital image close to the contact point 190 will be selected, the digital image 137 that has shortest distance from floating icon 120 is preferentially selected. A particular embodiment may be selected in floating icon selection mode.

Figure 8:
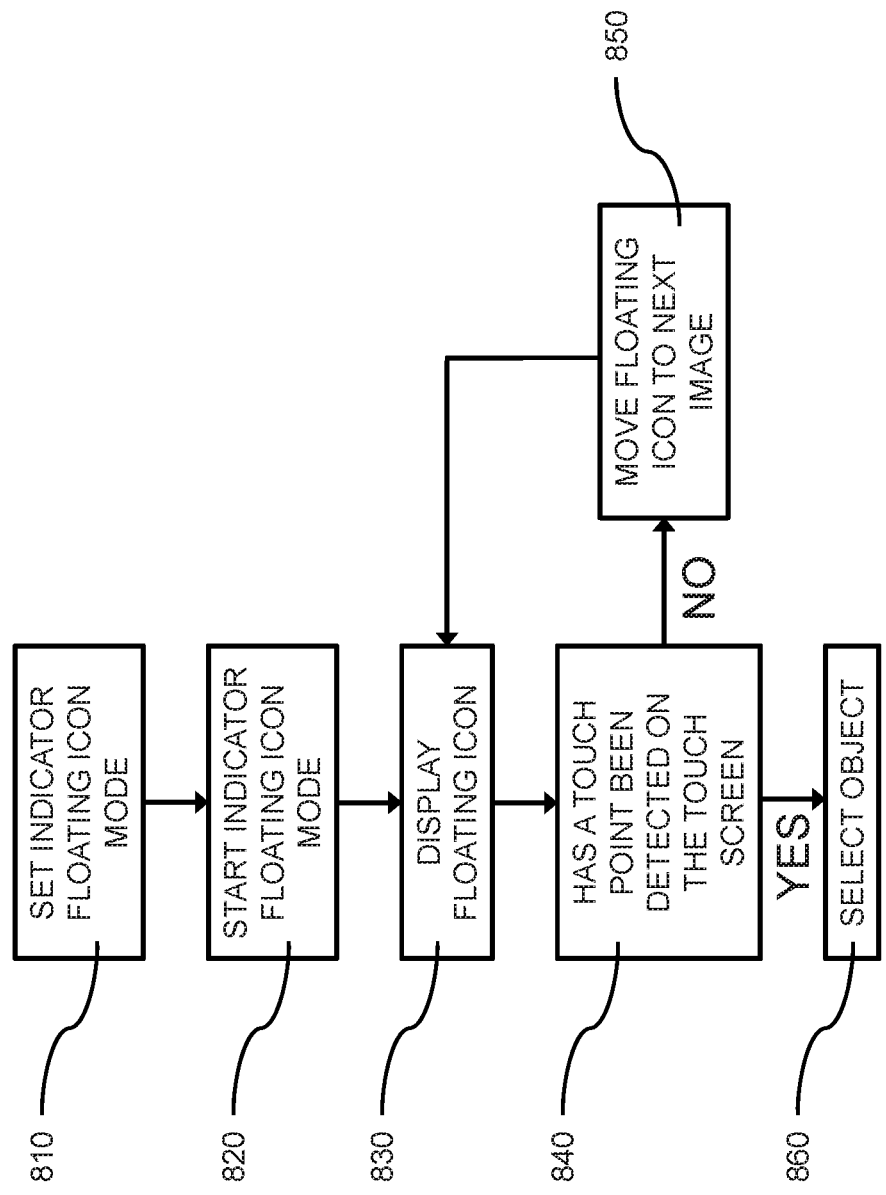
FIG. 8 is a block/flow diagram illustrating an embodiment in which an indicator represented by floating icon is displayed on a touch screen.

Referring to FIG. 8, a block/flow diagram illustrates an embodiment in which an indicator represented by floating icon is displayed on a touch screen.

In block 810, a user may set a device having a touch screen in an indicator floating icon selection mode to activate a module configured to display and move a floating icon, and detect selections on the touch screen. Setting the indicator floating icon selection mode may involve choosing between an indicator utilizing a floating icon and an indicator utilizing a change in a characteristic of the digital image. Setting the indicator floating icon selection mode may include choosing a floating icon from a set of floating icons hardwired into the integrated circuitry or stored in memory, choosing the transfer mode for the floating icon as smooth motion, choosing a set or variable speed (e.g., constant speed or speed based on selection probability or frequency), choosing whether the floating icon moves between digital images sequentially based on their display order, or intermittently based on their selection probability or frequency, and/or setting the amount of time a floating icon remains associated with a digital image.

In block 820, the indicator floating icon module is initiated, and program code relating to the floating icon is executed.

In block 830, a floating icon is associated with a displayed digital image, where the floating icon may have been selected when setting the floating icon selection mode, and may be displayed adjacent, around, or over a digital image.

In block 840, the indicator floating icon module initiates detecting an interaction that indicates selection of an object associated with a particular digital image at the time of the interaction. Generation of a contact point on the touch screen may be detected, and functions of the module executed based on position and/or time of the detected contact.

In block 850, if an interaction has not been detected, the floating icon may remain associated with a digital image for a predetermined amount of time and then move across the display to a different digital image. During a portion of the icon's movement, the floating icon may be positioned between digital images.

In block 860, if an interaction has been detected, the object may be activated, and display of the floating icon may be discontinued.

Figure 9:
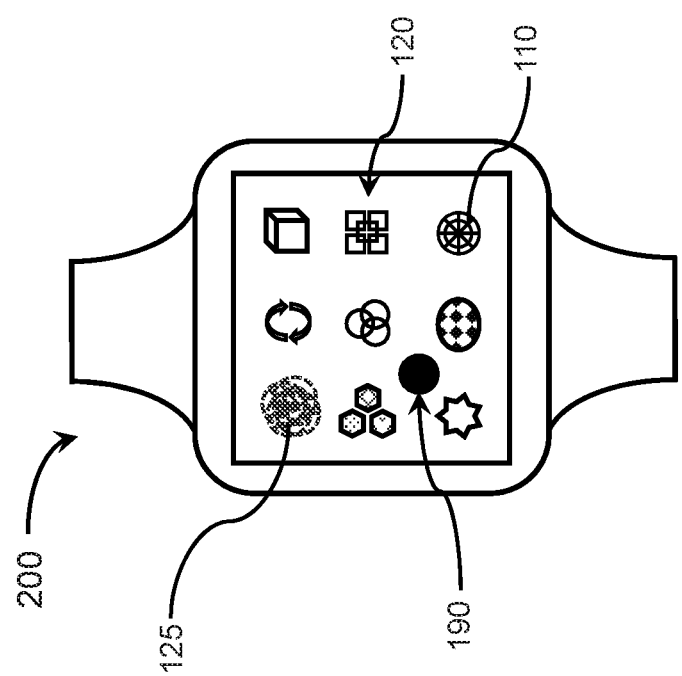
FIG. 9 is a smart watch display in which the digital image displayed on a smart watch touch screen moves about on the screen in accordance with an illustrative embodiment.

Referring to FIG. 9, an embodiment in which the digital image 110 displayed on a smart watch touch screen related to the object currently to be selected moves about or vibrates on the screen is shown. The digital image 125 moves about or vibrates on the touch screen 100 as an indicator that it would be selected if a touch point 190 were detected on the touch screen 100. Motion of the digital image 125 is illustrated in FIG. 8, as several overlapping images. The movement may be around a fixed point on the screen. Motion of the digital image may be pre-programmed or randomly generated. Each displayed digital image 110 may have a motion imparted to it for a predetermined period of time, or the duration of motion may be based on the probability or frequency of selection. The type and duration of motion may be set by the user at the time of mode selection.

Figure 10:
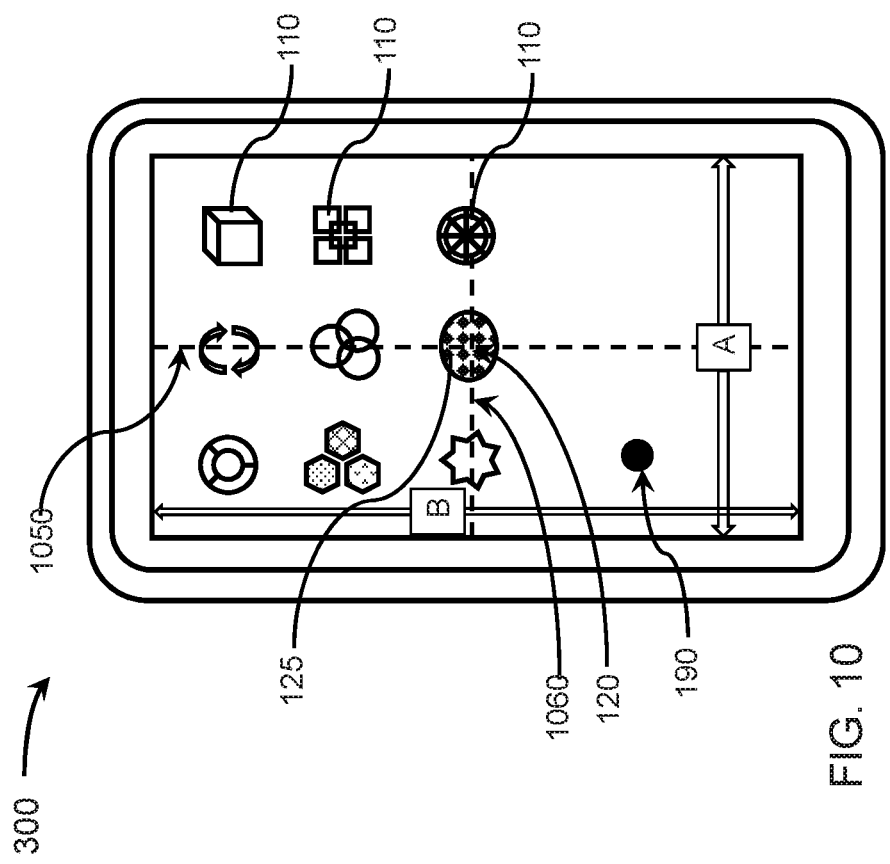
FIG. 10 is a smart phone display in which the digital image displayed on a smart phone touch screen is indicated by the intersection of two lines in accordance with an illustrative embodiment.

Referring to FIG. 10, an embodiment in which the digital image displayed on a smart phone touch screen related to the object currently to be selected is indicated by the intersection of two lines (also referred to as sliders) is shown. The intersection of two lines on the touch screen 100 form cross-hairs over one of the plurality of digital images to indicate it is would be selected if a touch point were detected on the screen. In various embodiments, a first slider 1050 (slider A) may be displayed as a line parallel to a vertical or long dimension of a display extending to the screen edges, and a second slider 1060 (slider B) may be displayed as a line parallel to a horizontal or short dimension of a display extending to the screen edges. The vertical slider 1050 may move in a horizontal direction, while the horizontal slider 1060 may move independently in a vertical direction. The intersection of the sliders may initially be positioned over an object which is most likely to be selected and each slider automatically moves back and forth.

In other embodiments, the floating icon 120 may be formed by two intersecting lines that do not extend all the way to the edges of the touch screen 100, and just form cross-hairs. The intersecting lines do not need to be horizontal and vertical, and may intersect at an angle other than 90 degrees.

In various embodiments, the first slider 1050 (slider A) and the second slider 1060 (slider B) may have the characteristic of moving slowly on a row and column on which an object which is highly likely to be selected is located and moving quickly on a row and column on which an object which is less likely to be selected is located.

In various embodiments, the first slider and the second slider may move smoothly across the display. When a user clicks any position on the screen to generate a contact point, an object closest to an intersection of the first slider and the second slider is identified as selected. When there are a plurality of objects closest to the intersection of the first slider and the second slider, the intersection of the sliders may be treated as a contact point for selection, and the closest object is selected. In various embodiments, the direction of travel for the first slider and the second slider may be taken into account. Digital images that the floating icon has passed over may be ignored in favor of the next digital image being approached by the floating icon.

In various embodiments, the contact point does not need to be in the vicinity of the digital image intended to be selected, or any of the digital images to indicate a selection, when the image is indicated by a floating icon or movement of the image.

Figure 11:
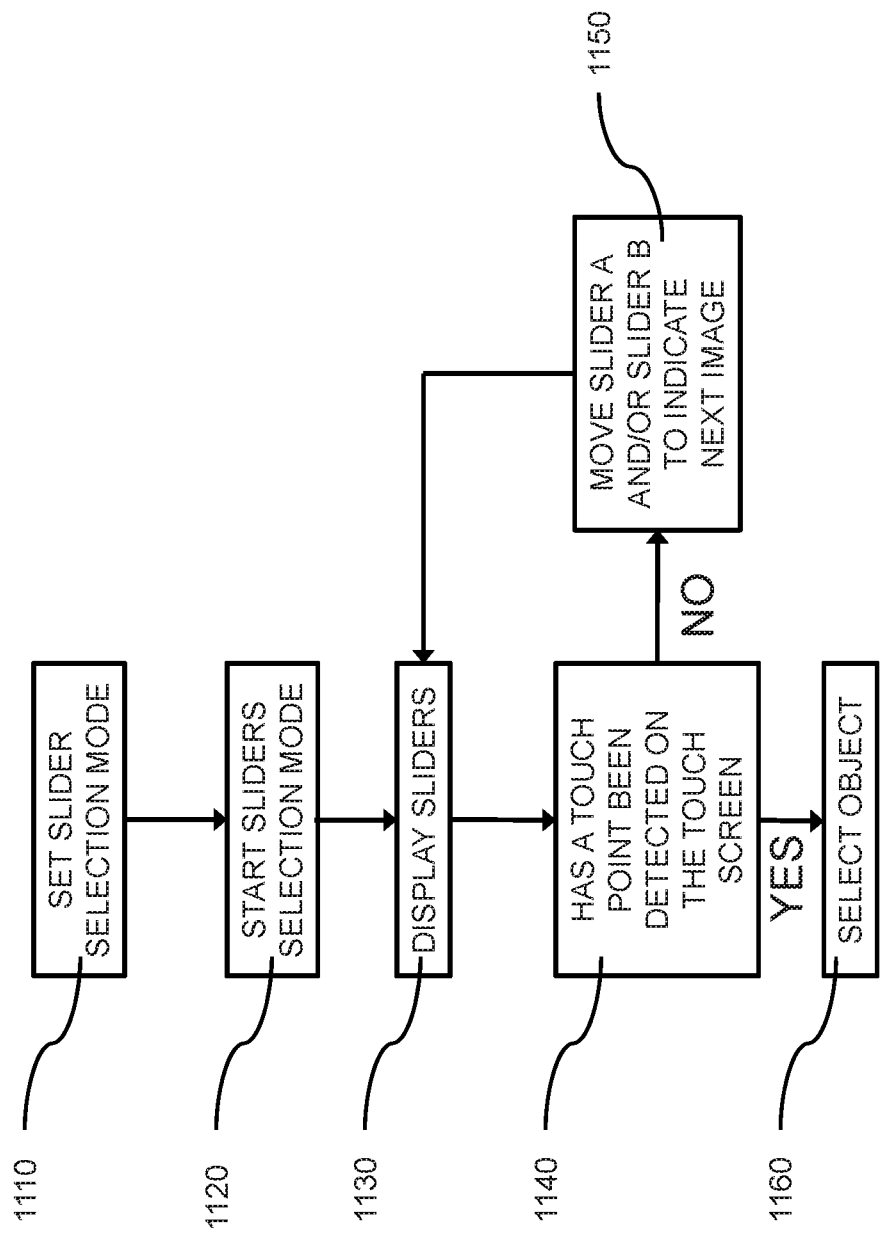
FIG. 11 is a block/flow diagram illustrating an embodiment in which an indicator represented by two intersecting sliders is displayed on a touch screen.

Referring to FIG. 11, a block/flow diagram illustrates an embodiment in which an indicator represented by two intersecting sliders is displayed on a touch screen.

In block 1110, a user may set a device having a touch screen in a slider selection mode to activate a module configured to display and move a pair of sliders (A and B), and detect selections on the touch screen. Setting the slider selection mode may include choosing a transfer mode for the floating icon (e.g., smooth motion, jumping, etc.), choosing a set or variable speed (e.g., constant speed or speed based on selection probability or frequency), choosing whether the floating icon moves between digital images sequentially based on their display order, or intermittently based on their selection probability or frequency, and/or setting the amount of time the slider intersection or cross-hairs remain associated with a digital image.

In block 1120, the indicator floating icon module is initiated, and program code relating to the floating icon is executed.

In block 1130, sliders A and B are associated with a displayed digital image, where the slider intersection may be displayed over a digital image. The initial location of the slider intersection may be based on the objects selection probability or frequency.

In block 1140, the slider selection module initiates detecting an interaction that indicates selection of an object associated with a particular digital image at the time of the interaction. Generation of a contact point on the touch screen may be detected, and functions of the slider selection module executed based on position and/or time of the detected contact.

In block 1150, if an interaction has not been detected, the sliders may remain associated with a digital image for a predetermined amount of time and then move across the display to a different digital image. During a portion of the sliders' movement, the intersection of the sliders may be positioned between digital images.

In block 1160, if an interaction has been detected, the object may be activated, and display of the sliders may be discontinued.

Figure 12:
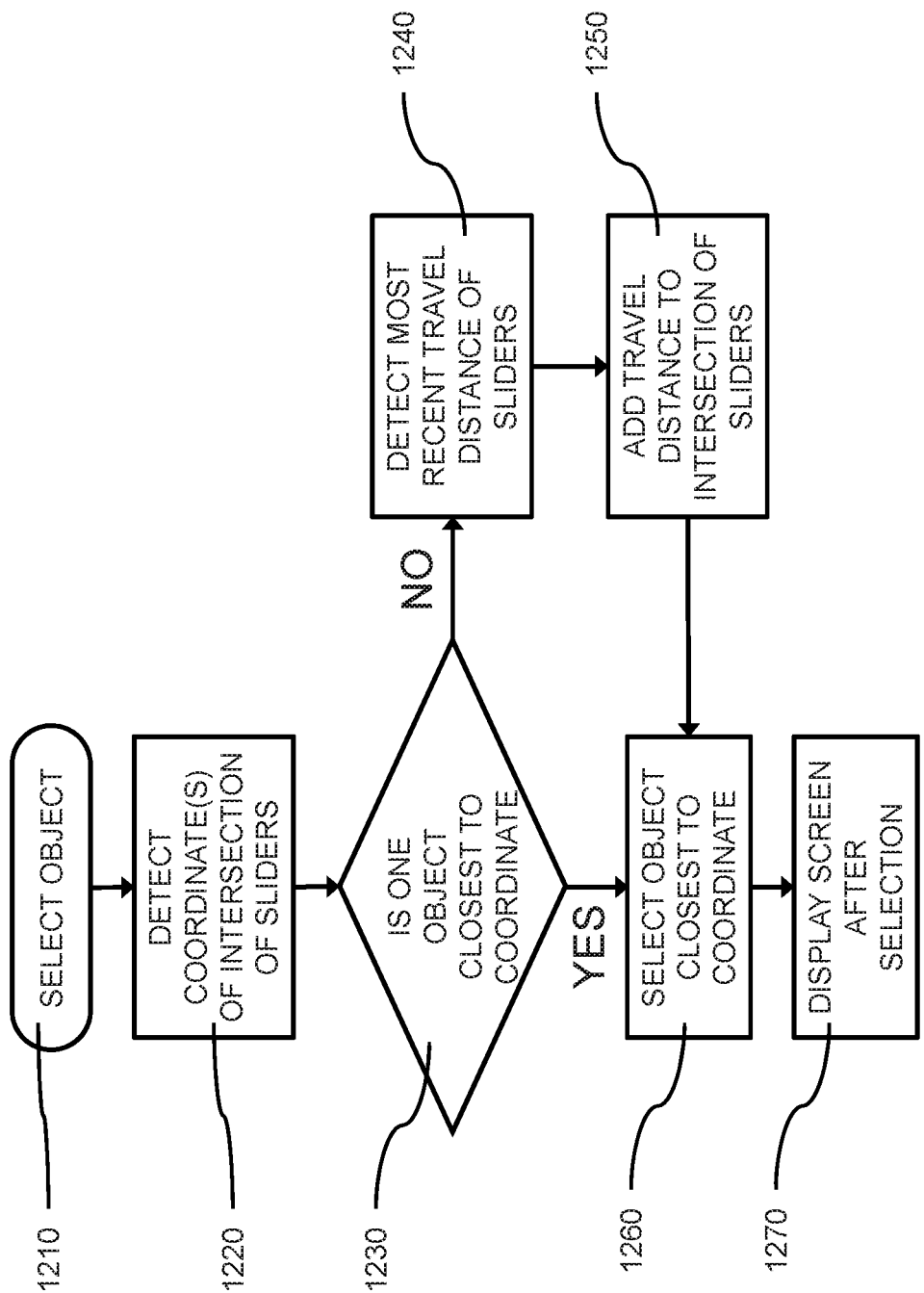
FIG. 12 is another block/flow diagram illustrating an embodiment in which an indicator represented by two intersecting sliders is displayed on a touch screen.

Referring to FIG. 12, a block/flow diagram illustrates an embodiment in which an indicator represented by two intersecting sliders is displayed on a touch screen.

In block 1210, a user initiates selection of an object corresponding to a displayed digital image. Selection may be indicated by interacting through contact with the touch screen display. A processor may detect interaction with the touch screen and execute stored computer code in response to a selection, where the computer code may be stored in memory coupled to the processor.

In block 1220, the coordinate(s) of the floating icon shown as the intersection of two moving sliders may be determined. The coordinates may be stored and/or compared with the coordinates of the digital images displayed on the touch screen. The coordinates of the digital images may be calculated or stored in a lookup table. The comparison of the coordinates may be done by the processor, and may involve calculating the location of the floating icon and/or digital images, and/or accessing stored coordinates of the digital images in a look up table stored in memory. The coordinate or coordinates of the floating icon and/or digital images may be represented and stored as X-Y coordinates, vector coordinates from an origin, or as other coordinates known in the art.

In block 1230, whether one digital image is closest to the coordinates of the intersection of the sliders is determined. In embodiments in which the two sliders are displayed as moving across the touch screen, a user may indicate a selection when the intersection is in a space between two or more digital images. A determination of which digital image the intersection of the sliders is associated with may have to be determined.

In block 1240, if a determination of the closest digital image cannot be made based on the coordinates of the intersection of sliders and the one or more digital images, the direction of motion of the intersection of sliders may be determined. A digital image along the path of motion of the intersection of sliders may be weighted more heavily than a digital image already passed by the floating icon. The travel distance of the intersection of sliders may be determined.

In block 1250, a travel distance may be added to the coordinates of the intersection of sliders to provide a displacement from an initial coordinate. A digital image closer to the intersection of sliders after addition of a travel distance may be identified as selected.

In block 1260, if a determination of the closest digital image can be made based on the coordinates of the intersection of sliders and the one or more digital images, the corresponding object relating to the selected digital image may be activated, and display of the sliders may be discontinued.

In block 1270, the sliders may be displayed on the touch screen after a previous object has been executed. A process of transferring the sliders between displayed digital images indicating available objects may be re-started.

Figure 13:
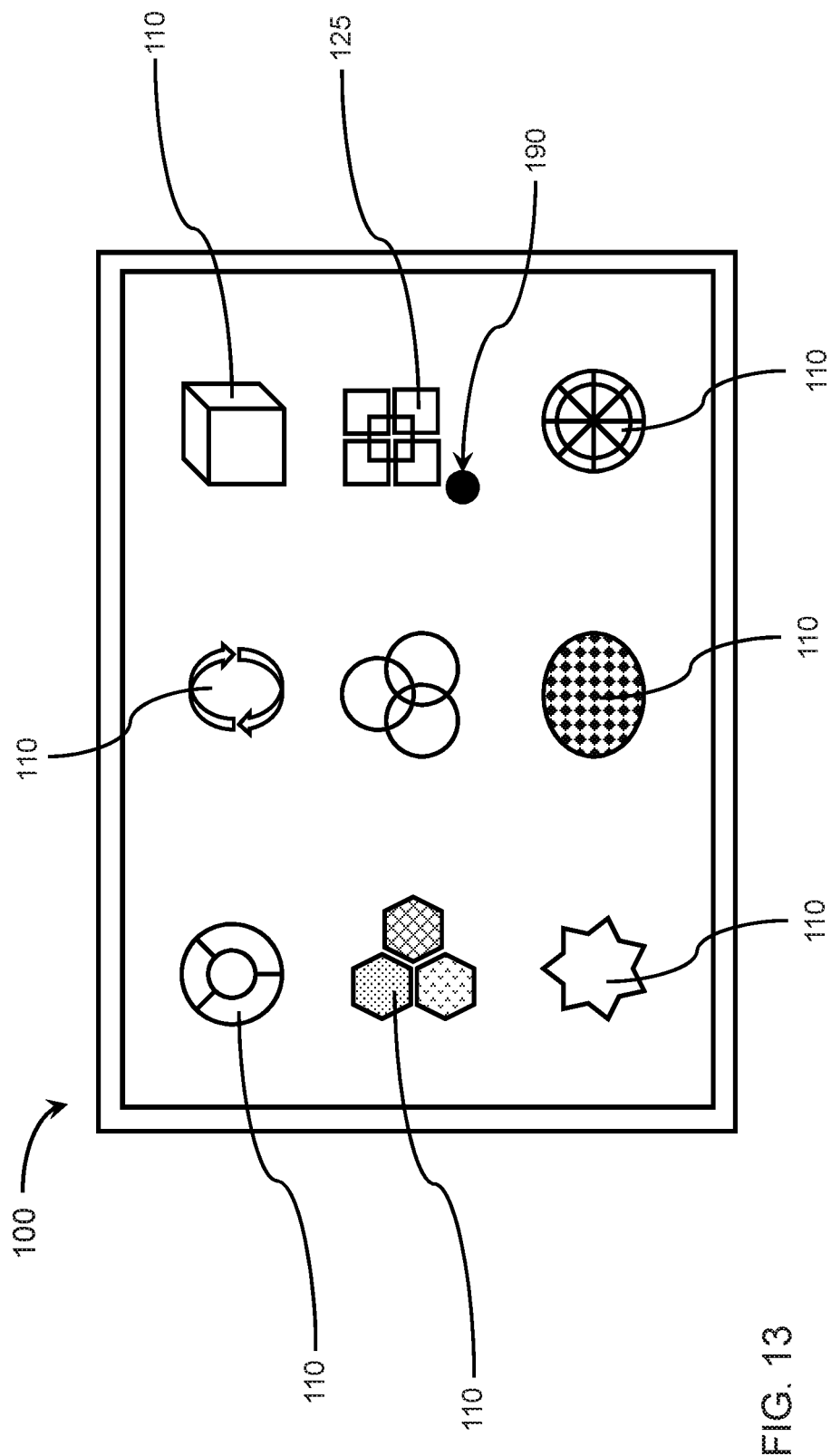
FIG. 13 is a touch screen display presenting a plurality of selectable objects represented by digital images in accordance with an illustrative embodiment.

Referring to FIG. 13, an embodiment having a touch screen display 100 presenting a plurality of selectable objects represented by digital images 110 at the same time is shown. A contact point 190 detected near an object to be selected 125 initiates an increase in size of the digital image closest to the contact point. An increase in size of the digital image 110 is an indicator that it would be selected if a second touch point were detected on the touch screen 100. The increase in size may be delayed by a set duration after a contact point is initially generated to avoid unintended initiation. A user can determine if the intended digital image is selected based on which image is magnified. If the correct digital image is magnified, generating a separate contact point may be detected as a selection of the enlarged image. An incorrectly selected digital image may be cancelled by interrupting the contact point.

Figure 14:
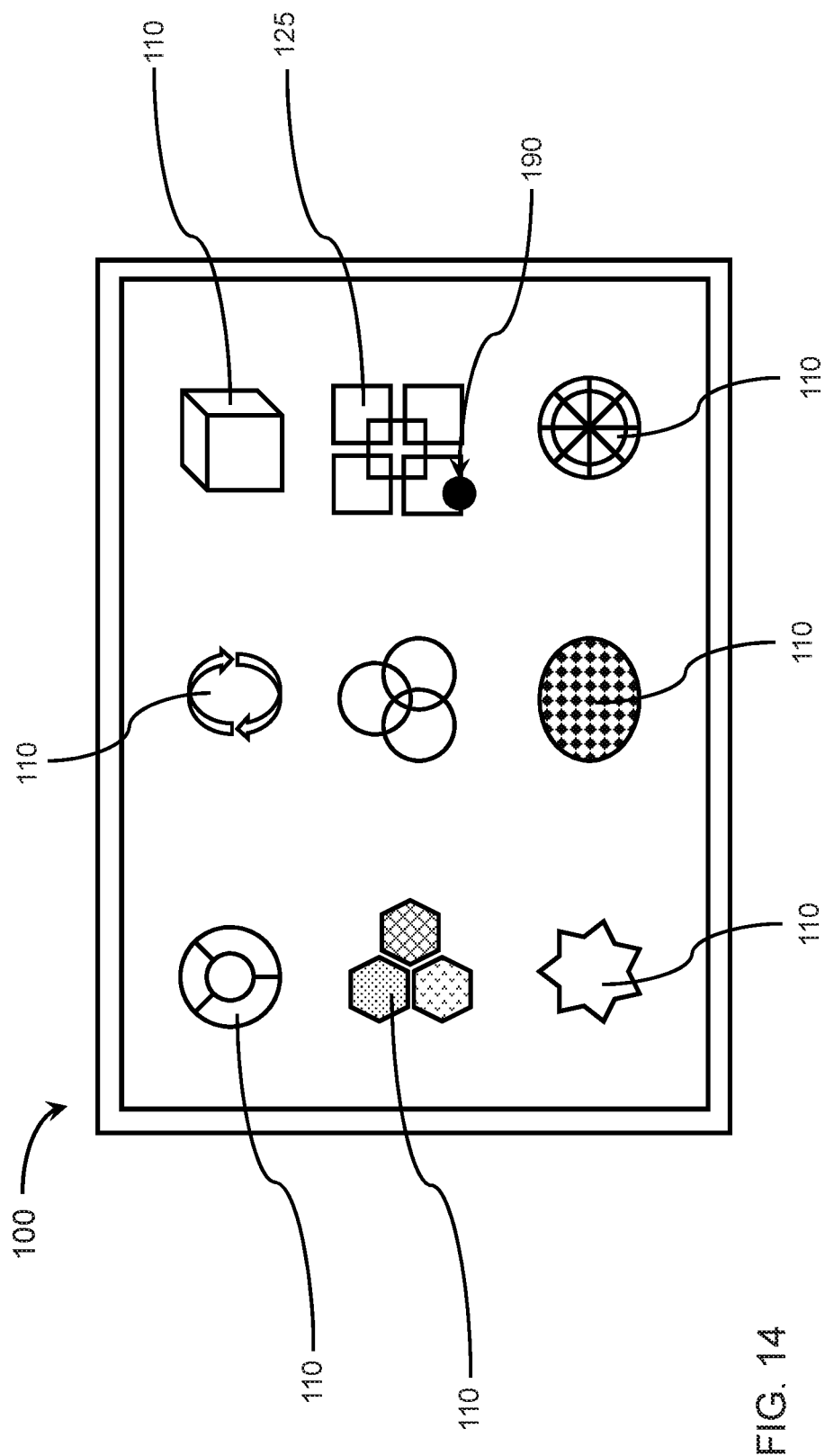
FIG. 14 is of the embodiment depicted in FIG. 13 after a delay has passed.

Referring to FIG. 14, the embodiment depicted in FIG. 13 is shown after the delay has expired. The digital image corresponding to the object to be selected 125 has increased in size. If a user maintains the contact point, the size of the digital image may continue to increase. For example, the digital image may be magnified and displayed like a balloon being inflated. The amount of magnification increases with the length of the duration that contact is made with the touch screen. In various embodiments, if the contact point is maintained for too long, the digital image may be shown as bursting and temporarily removed from the screen. Since the size of the digital image increases and/or decreases automatically, it is not necessary to perform a zoom-in operation, so multiple contact points maintained on the touch screen during selection are not required.

Figure 15:
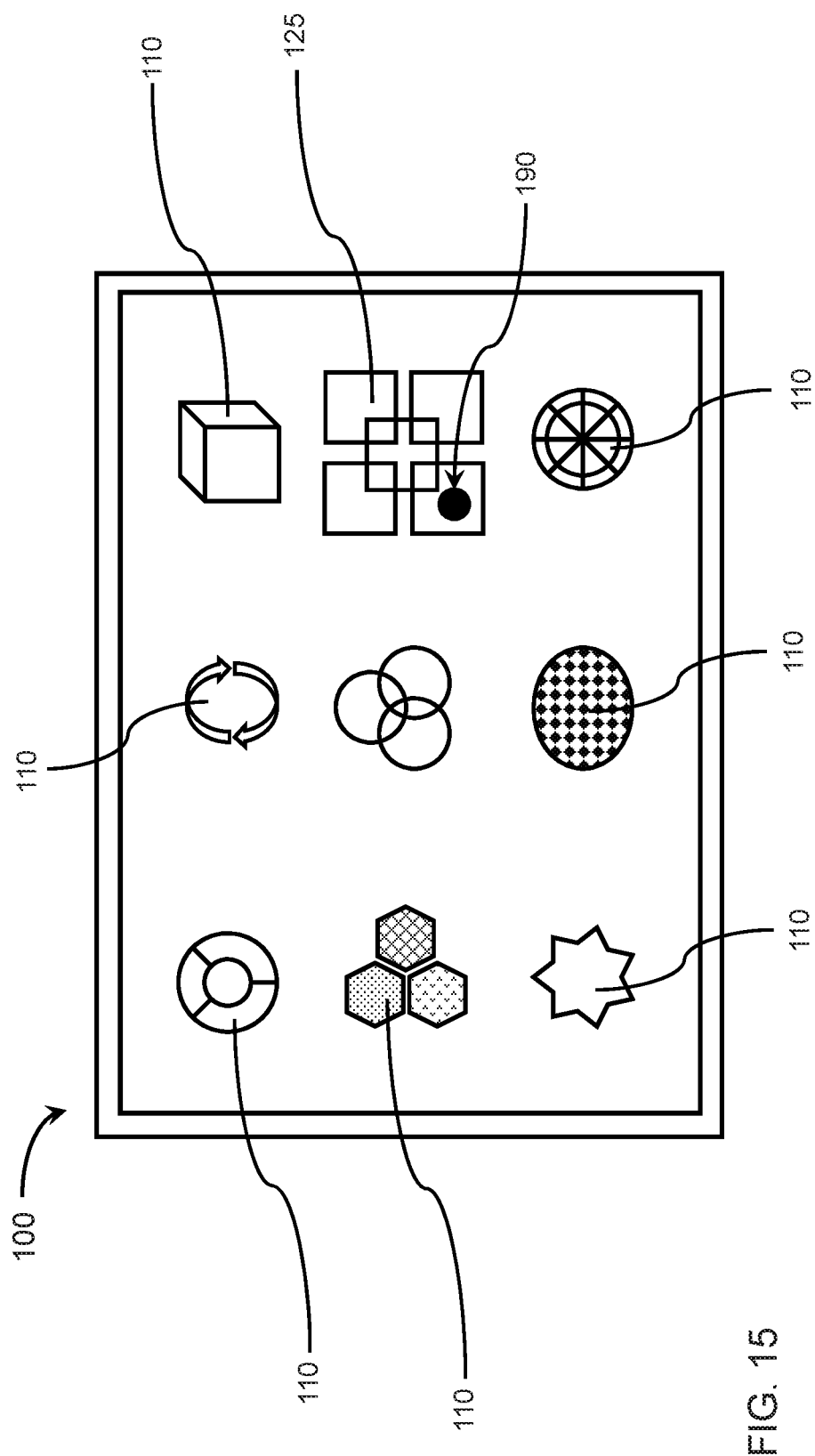
FIG. 15 is of the embodiment depicted in FIGS. 13 and 14 after the contact point has been maintained continuously for a longer duration.

Referring to FIG. 15, the embodiment depicted in FIGS. 13 and 14 is shown after the contact point has been maintained continuously for a longer duration. In various embodiments, the size of the digital image may be limited to a final size, or the size of the digital image may return to its original size if the contact point is maintained for longer than an established time limit. The digital image may return to its original size if maintenance of the contact point is interrupted. For example, the digital image may return to its original size if the user removes a finger from the touch screen. When the finger is removed from the touch screen, the digital image may gradually shrink back to its original size. In an embodiments, the digital image may be shown as popping if the contact point is maintained for longer than an established time limit. The size of the digital image changes without performing a zoom-in operation that obscures the screen.

Figure 16:
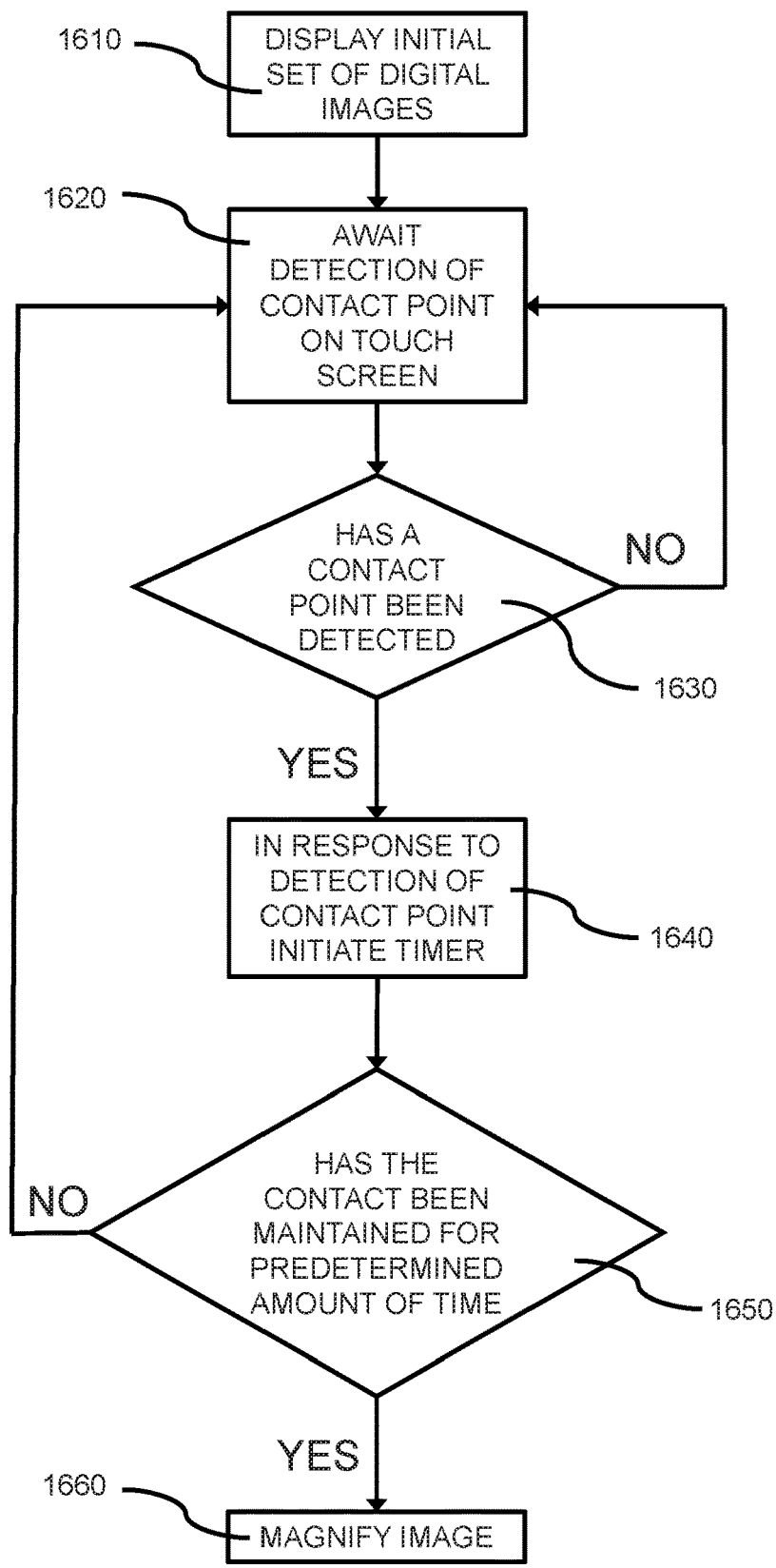
FIG. 16 is a block/flow diagram illustrating an embodiment in which the duration that a contact point is maintained on the touch screen is monitored to determine if an image should be magnified.

Referring to FIG. 16, a block/flow diagram illustrates an embodiment in which the duration that a contact point is maintained on the touch screen is monitored to determine if an image should be magnified. The time period that a contact point is detected may be timed using an internal clock or other reference. If the contact point is maintained for a duration longer than a predetermined time, a determination is made that magnification of a digital image is desired by a user.

In block 1610, the digital images representing an initial set of objects are displayed on the touch screen. Additional objects and images may be stored in a device memory, but these objects may not be initially available to a user.

In block 1620, no action may be taken until a contact point is detected.

In block 1630, the touch screen may be monitored to determine if a contact point has been generated on the touch screen. A processor may be configured and coupled to the touch screen to detect when a contact point is generated.

In block 1640, in response to a contact point being detected, a timer, clock, or countdown may be initiated to determine how long the contact point is maintained on the touch screen. Coordinates of the contact point may also be determined to identify the digital image closest to the contact point.

In block 1650, if the timer, clock, or countdown reaches a predetermined value, the contact can be recognized as an initiation to magnify the closest digital image. A processor may be configured to calculate and/or measure the amount of time a contact point is maintained and compare the measured/calculated value to a predetermined value.

In block 1660, once the predetermined amount of time has be reached, an enlarged digital image may be displayed. A processor coupled to the touch screen may initiate a routine to recalculate the size of the digital image closest to the contact point, or look up new graphics data stored in memory coupled to the processor, and redisplay a larger version of the identified digital image.

In another embodiments, the size of each of a plurality of displayed images may be changed without the generation of a contact point on the touch screen. The size of each digital image may be automatically changed over time. In various embodiments the size of the digital images may be changed sequentially based on their display order, or based on their selection probability or frequency. The size of the digital images may be changed gradually, like a balloon being inflated or deflated. In various embodiments, at the end of the time period and/or when the size of the digital image is at a predetermined maximum, the image may 'burst' like an over-inflated balloon. The size of a subsequent digital image may then begin to increase. A 'burst' digital image may be removed from the display for a predetermined period of time. The size of the digital image may be decreased in response to the contact point being discontinued.

In one or more embodiments, a user may select an enlargement mode to change the size characteristic of the digital images over time.

Figure 17:
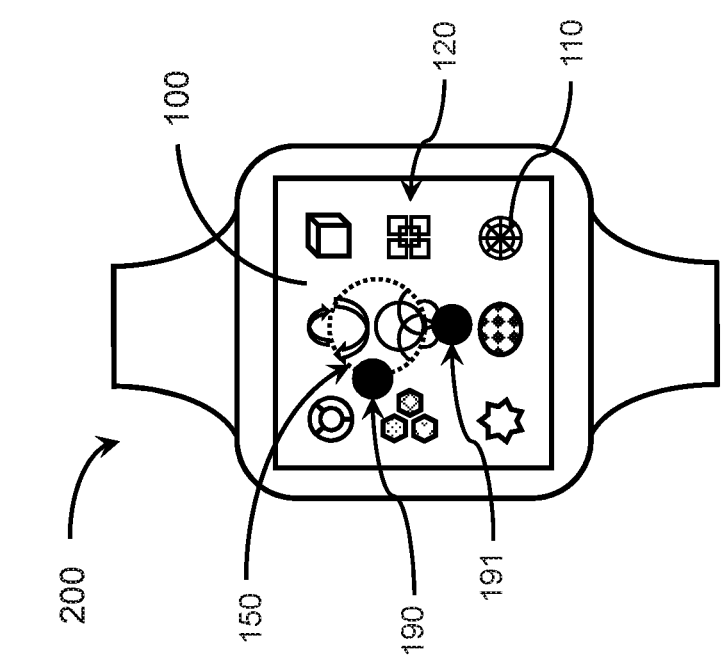
FIG. 17 is a smart watch having a small touch screen display showing a magnified area in accordance with an illustrative embodiment.

Referring to FIG. 17, an embodiment comprising a smart watch having a small touch screen display, a set of digital images 110 displayed on the small touch screen display, and a magnified area on the small touch screen display is shown. The magnified area 150 on the touch screen display 100 of the smart watch 200 may initially be positioned at a predetermined location on the touch screen, or the magnified area 150 may only appear in response to a contact point 190 being detected. In various embodiments, the magnified area 150 may be centered on or tangential to the contact point 190, and may move with the contact point. A user may selected a preferential arrangement for the magnified area in a set-up. The user defined setting(s) may be stored in a memory for later retrieval.

Portions of one or more digital images within the magnified area 150 of the touch screen may be enlarged to provide a more detailed view of the digital image(s), and identify the digital image as an object to be selected 125. The digital image(s) may be proportionally enlarged (e.g., 50% bigger) compared to non-magnified images or portions of images.

In various embodiments, a user may select the object corresponding to the digital image within the magnified area 150 by generating a second contact point 191 on the touch screen. In various embodiments, the second contact point 191 may be anywhere on the touch screen, whereas in other embodiments, the second contact point may be within the magnified area 150.

Figure 18:
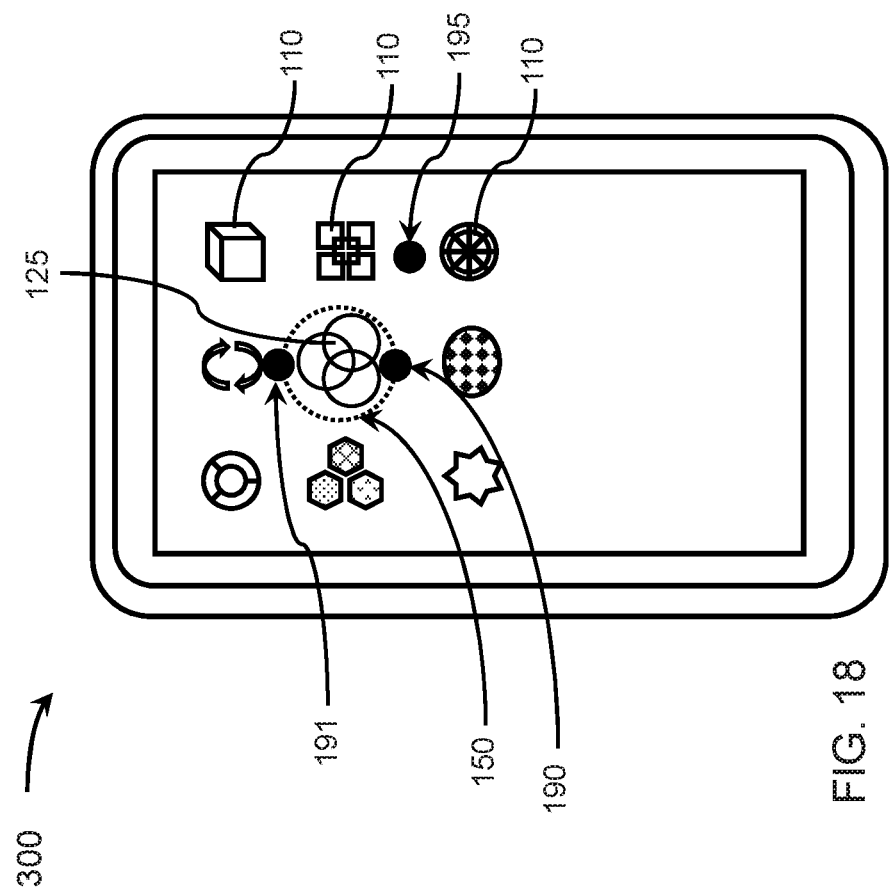
FIG. 18 is a smart phone having a small touch screen display with a magnified area over a digital image in accordance with an illustrative embodiment.

Referring to FIG. 18, an embodiment comprising a smart phone 300 having a small touch screen display, a set of digital images 110 displayed on the small touch screen display, and a magnified area 150 over a digital image is shown.

In various embodiments, the magnified area may be defined by the distance between two contact points. For example, a user may generate a first contact point 190 on one side of a digital image and a second contact point 191 on the other side of the digital image, where the distance between the two contact points define the diameter of the magnified area 150, as shown in FIG. 17. In various embodiments, the digital images within the magnified area may be gradually enlarged while the two contact points are maintained on the touch screen. In response to at least one of the two contact points being interrupted, the magnified area may be discontinued and the magnified digital images returned to an initial size.

In one or more embodiments, the touch screen display 100 may be configured to recognize two or more contact points at the same time. A processor coupled to the touch screen may detect the two or more contact points generated on the touch screen. If two points are selected in a selection mode, for example, the magnified icon selection mode, a magnified area between the two contact points may be rendered on the touch screen. The magnification of the magnified area may be set and stored in memory. If a third contact point 195 is generated on the contact screen while a digital image is within the boundary of the magnified area, the processor may detect the third contact point as a selection of the digital image 125, and the selected object is initiated (e.g., an application is launched, a hyperlink is followed, etc.).

In various embodiments, to avoid digital images expanding beyond the edge of the touch screen display, the position of the digital images may be moved inwards towards the center of the touch screen.

Figure 19:
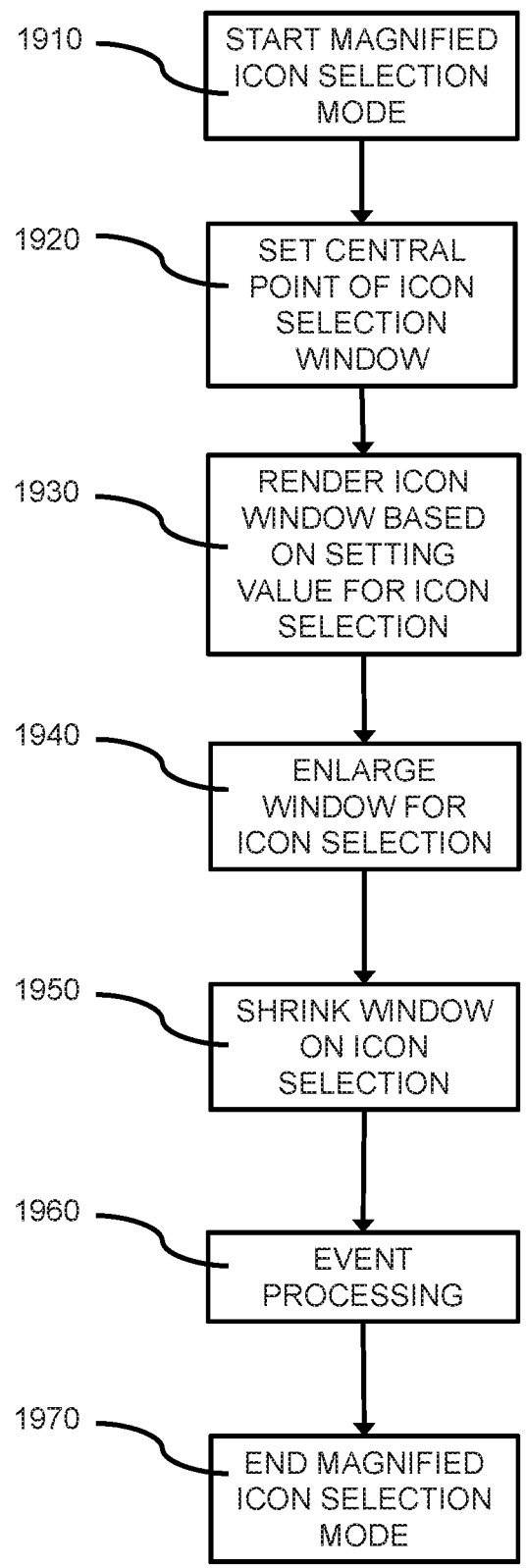
FIG. 19 is a block/flow diagram illustrating an embodiment in which a magnified area is presented on the touch screen.

Referring to FIG. 19, a block/flow diagram illustrating an embodiment in which a magnified area is presented on the touch screen is shown.

In block 1910, a user may set a device having a touch screen in a magnifying icon selection mode to activate a module configured to display and move a magnified area on a touch screen, and detect selections on the touch screen. Setting the magnifying icon selection mode may involve choosing between providing a magnified area on the touch screen initially, and providing a magnified area when a contact point is detected. Setting the floating magnified area selection mode may include setting a size, which may be a diameter, (e.g., pixels, mm, inches) for the magnified area, setting a magnification value (e.g., 50% increase, 75% increase, etc.) for enlargement of the digital images, choosing a maximum size of the magnified area's diameter to provide a larger magnified area (e.g., 1.25×, 1.5×, 2×, 2.5 initial dia.), and choosing a rate of enlargement of the magnified area from an initial size to a maximum size. User selections may be stored in memory coupled to a processor for later use and/or as default settings.

In block 1920, an initial position of the magnified area may be set. In various embodiments, the magnified area may appear as a round window with enlarged images within the boundary of the window. In various embodiments, the initial position of the magnified area may be centered on or adjacent to the contact point.

In block 1930, the magnified area may be presented on the screen with the properties (e.g., initial size, location, magnification, etc.) set during the selection mode.

At 1940, the size of the magnified area may be enlarged to encompass at least one digital image displayed on the touch screen. A magnified area may be enlarged to avoid obstruction by a user's finger and allow a user to see the digital image overlaid by the magnified area. The size of the magnified area may be increased from the initial size to the maximum size by maintaining the contact point on the touch screen for a duration of time.

In block 1950, the magnified area may decrease back to an initial size, or may vanish from the touch screen when the contact point is interrupted or a magnified digital image is selected. In various embodiments, an object associated with a magnified digital image may be selected by generating a second contact point within the boundary of the magnified area. In other embodiments, an object associated with a magnified digital image may be selected by generating a second contact point anywhere on the touch screen.

In block 1960, a selected object is initiated (e.g., an application is launched, a hyperlink is followed, etc.).

In block 1970, after initiating the selected object, the magnified area may disappears.

Figure 20:
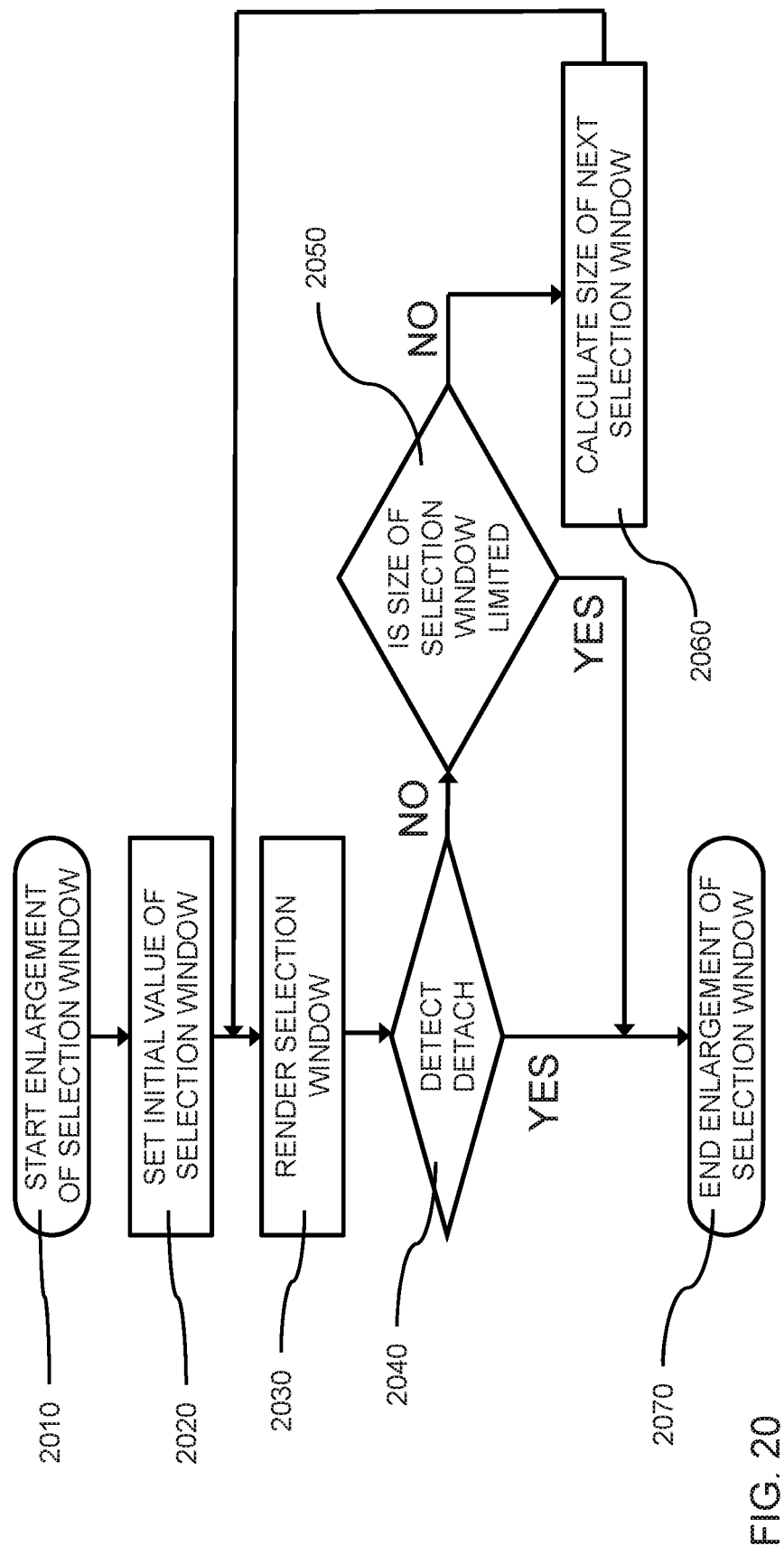
FIG. 20 is a block/flow diagram illustrating an embodiment of the process for enlarging the magnified area.

Referring to FIG. 20, a block/flow diagram illustrating an embodiment of the process for enlarging the magnified area is shown.

In block 2010, in response to maintained contact on the touch screen, the size of the magnified area may increase to provide a larger magnified viewing area.

In block 2020, a user may set an initial size of the magnified area.

In block 2030, the magnified area at the initial size may be displayed on the touch screen, where digital images within the boundary of the magnified area are enlarged.

In block 2040, a processor configured to detect a contact point on the touch screen determines if a contact point is no longer being generated on the touch screen.

In block 2050, if a contact point has not been interrupted, the processor determines if the magnified area is at a maximum size.

In block 2060, if the magnified area is not currently at a maximum size, the processor calculates a new size and boundary of the magnified area, renders the new magnified area on the touch screen, and adjusts the display of digital images within the new boundary of the magnified area.

In block 2070, if an interruption of the contact point is detected, the enlargement of the magnified area is ended, and the magnified area may disappear or return to an initial size and position.

Figure 21:
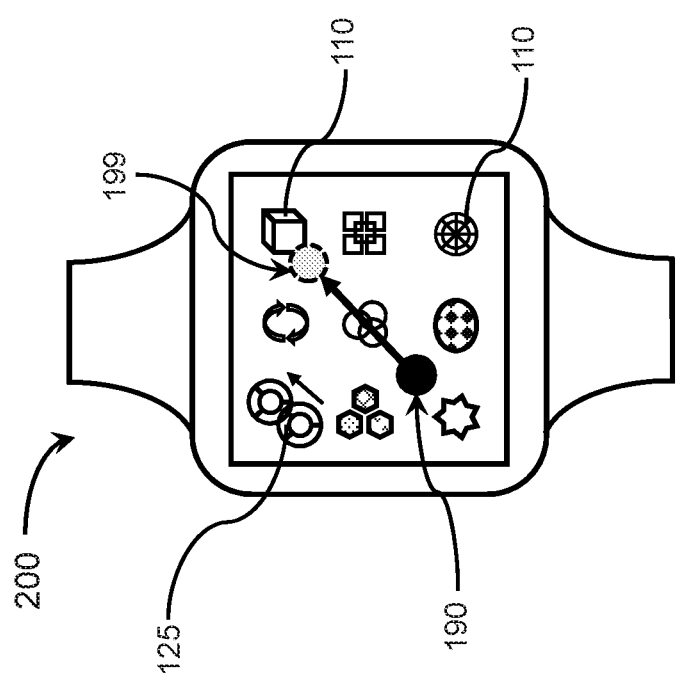
FIG. 21 is a smart watch having a small touch screen display, and a set of digital images displayed on the small touch screen display in accordance with an illustrative embodiment.

Referring to FIG. 21, an embodiment comprising a smart watch having a small touch screen display, and a set of digital images displayed on the small touch screen display is shown. In an embodiment, a digital image may be indicated as selectable 125 by showing the digital image moving in a predetermined direction on the screen. In various embodiments, a user may select an object by duplicating the digital image's movement with a contact point 190 on the touch screen. Selection of an object associated with a digital image is facilitated by automatically imparting the motion to the displayed digital image.

In one or more embodiments, a motion may be imparted to one or more digital images 110 displayed on a touch screen display 100. Each digital image may be shown with a unique motion to identify the digital image as selectable. A user may select a specific digital image by generating a contact point on the touch screen and moving the contact point in the same manner as the desired digital image is moving. For example, a selectable digital image 125 may be shown moving back and forth in an upward diagonal direction. A user may select the specific digital image by touching the touch screen at an initial point to generate a contact point 190, and moving the generated contact point in in an upward diagonal direction to a final position 199, as shown in FIG. 21. A processor coupled to the touch screen may be configured to detect the path and/or pattern of motion imparted to a contact point, and determine which displayed digital image is associated with the contact point motion. Since an object is indicated as selectable by its motion on the touch screen, a selection is accomplished by generating a contact point on the touch screen and moving the contact point in the same manner as the desired digital image, a user does not have to obscure the screen by performing a zoom-in operation.

In various embodiments, a digital image may move back and forth in a straight path, which may be up and down, side to side, or diagonally. A digital image may also move in a predefined pattern, for example, a circular pattern, a zig-zag pattern, or a figure-8 pattern. Different motions may be assigned to different digital images, where the motion may be automatically assigned to an image in memory or by a processor. In various embodiments, the same motion may be assigned to all displayed digital images, but only one object moves at a time.

In one or more embodiments, each digital image in the same row or column may be assigned the same movement pattern. A user may select from the set of digital images having the same movement pattern by rendering the appropriate path or pattern of motion through a contact point one or more time. For example, to select the second digital image in a row or column assigned a specific movement, a user would duplicate the movement twice on the touch screen.

In various embodiments, a single path or pattern of motion may be assigned to all digital images displayed on the touch screen, but only one digital image is shown moving on the screen at one time. A user may then selected the moving digital image by rendering the appropriate path or pattern of motion through a contact point, while the digital image is moving.

In various embodiments, the specific movement assigned to one or more of the digital images may be stored in memory. The processor may access the assigned movement(s) to show the digital images moving in their assigned path or pattern and/or to compare the path or pattern of movement of a contact point with a displayed path or pattern of a moving digital image.

Figure 22:
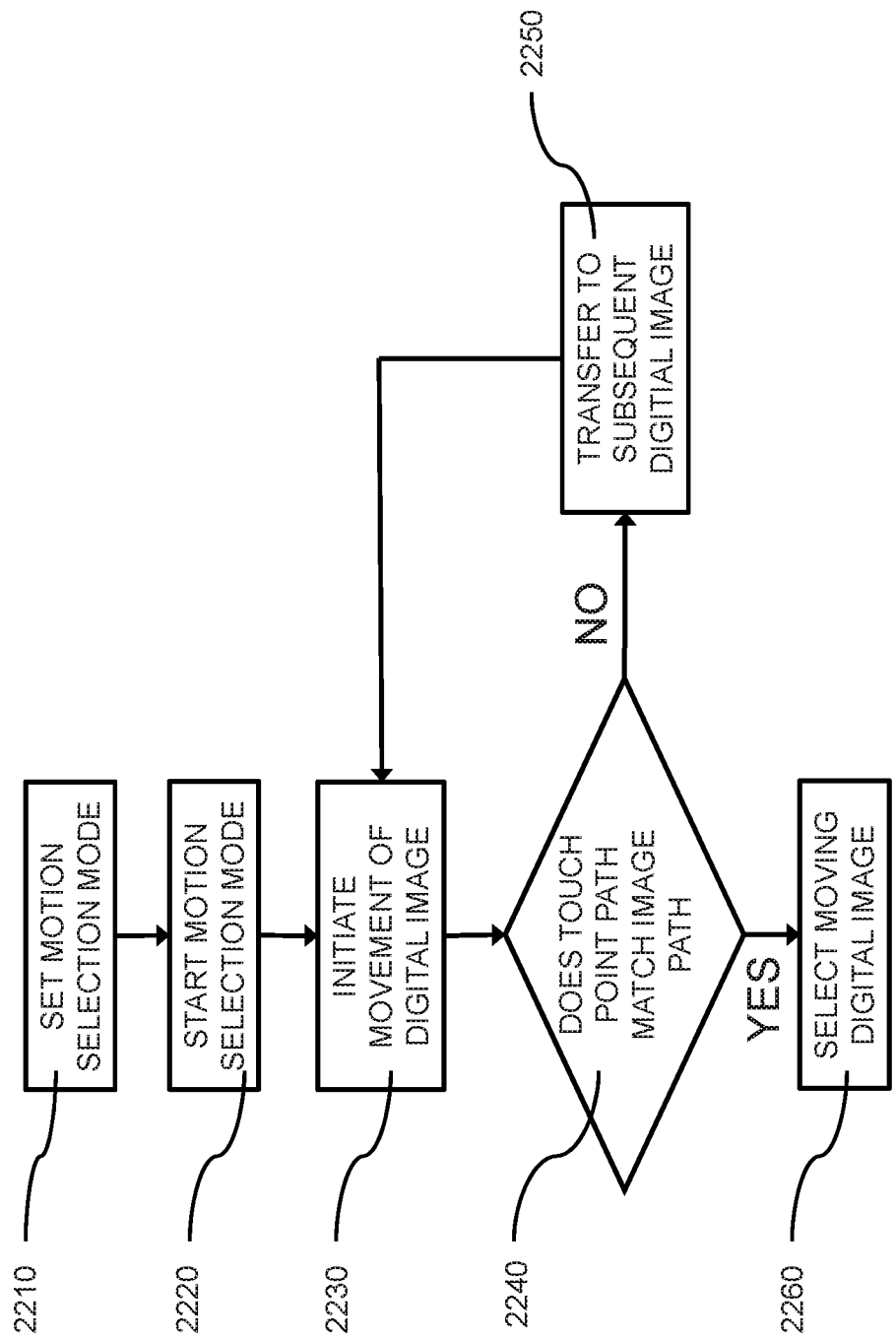
FIG. 22 is a block/flow diagram illustrating an embodiment in which digital images displayed on the screen move.

Referring to FIG. 22, a block/flow diagram illustrates an embodiment in which digital images displayed on the screen move. In various embodiments, a particular motion may be imparted to each digital image displayed on the touch screen, as an indicator that the object is selectable. Since selectability is indicated by the motion assigned to an object, a user may select an object without performing a zoom-in operation.

In block 2210, a user may set a device having a touch screen in a motion selection mode to activate a module configured to display and move the displayed digital images and detect selections on the touch screen. Setting the motion selection mode may involve choosing between different motions for each displayed digital image and assigning the same or similar motions to a subset of digital images being displayed. The motion selection mode may also involve selecting an arrangement of the digital images, and selecting whether all digital images in the same row or column will be assigned the same motion. Independent motion for each of the digital images may be set to allow only one digital image to move at one time. All of the digital images may move in different directions or patterns at the same time. Setting the motion selection mode may also include choosing a set of motion paths or patterns hardwired into the integrated circuitry or stored in memory, choosing whether the digital images change between a stationary state and a moving state sequentially based on their display order, or based on their selection probability or frequency, and/or setting the amount of time a digital image remains in motion to allow selection.

In block 2220, the motion module is initiated, and program code relating to the moving the digital images is executed.

In block 2230, a motion path or pattern is associated with a displayed digital image, where the motion may have been selected when setting the motion selection mode. An initial digital image may be shown moving on the touch screen.

In block 2240, the generation of a contact point is detected and the path or pattern of movement of the contact point is compared to the path or pattern of movement of a digital image. A processor may be configured to determine the direction of motion of a contact point (e.g., as a vector, a series of coordinates, etc.) and compare the path or pattern to a path or pattern of motion stored in memory and assigned to a particular digital image. If movement of the contact point is not detected, a currently moving digital image or a digital image closest to the contact point may be treated as selected.

In an embodiments, all of the digital images may move in different directions or patterns at the same time, and a user may select an object by moving a contact point in a motion corresponding to the motion of the digital image to be selected.

In block 2250, if no contact point, no movement of a contact point, or movement of a contact point that does not correspond to the movement of a digital image is detected during the time an image is in motion, the digital image is treated as not selected. Once the duration of motion has expired, motion may be transferred to a subsequent digital image.

In block 2260, if movement of a contact point corresponds to the movement of a digital image, the object corresponding to the moving digital image is selected, and the application or function executed, the hyperlink followed, etc.

Figure 23:
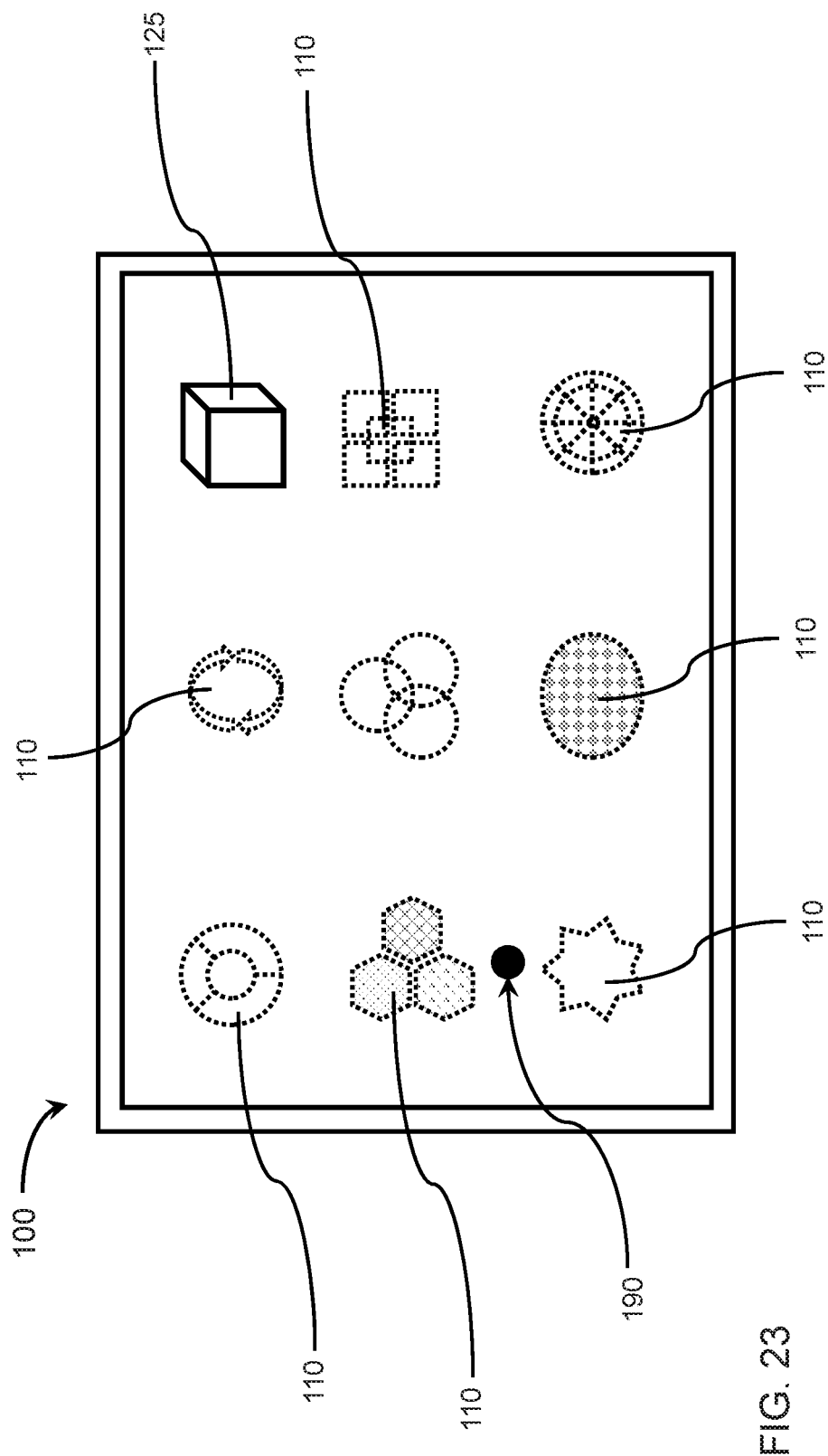
FIG. 23 is a touch screen display, where the transparency of the displayed digital images changes in accordance with an illustrative embodiment.

Referring to FIG. 23, an embodiment having a touch screen display 100 presenting a plurality of selectable objects represented by digital images 110 at the same time, where the change in transparency of the digital images is shown. In various embodiments, one of the plurality of digital images is displayed as a solid image, as an indicator that it is selectable, whereas the remaining images on the touch screen are displayed as transparent images. The solid digital image identifies the object to be selected 125. Receiving a command from a user to select the identified object may involve interacting with the touch screen, for example by touching the screen to generate a touch point 190. In various embodiments, the touch point 190 may be adjacent to the solid digital image or on a different portion of the display.

In one or more embodiments, the solid digital image may transition to a transparent digital image and a subsequent digital image may transition from a transparent state to a solid state to indicate the transfer of selectability. The transparency of the digital images may change over time. In various embodiments, the order and/or duration that objects are indicated as being selectable may be based on the past frequency of use or probability of selection. The digital image may remain solid for a longer duration for a more selected object, and transition to a transparent digital image more quickly for a less selected object, as determined by ratios or percentages of selection. When a contact point is generated at any location on the touch screen the object presently corresponding to the solid image would be selected, and the application or function executed, the hyperlink followed, etc. Since the selectable object is indicated by the transparency characteristic of the associated digital image, a user does not need to obscure the screen by performing a zoom-in operation for selection.

In an embodiment, alternating digital images may be displayed as solid and transparent, such that there are multiple solid and transparent images displayed on the touch screen at the same time. The plurality of solid images may then convert to transparent images, and the transparent images may convert to solid images, such that the images are alternately changing their transparency state. The transparency of the digital images may cycle between solid and transparent. Digital images with a lower transparency would be preferentially selected over a neighboring digital image with a greater transparency.

In various embodiments, after an object has executed, the digital images may be re-displayed on the touch screen, where the objects are displayed with their original transparency. A digital images initial transparency characteristic may be stored in memory.

Figure 24:
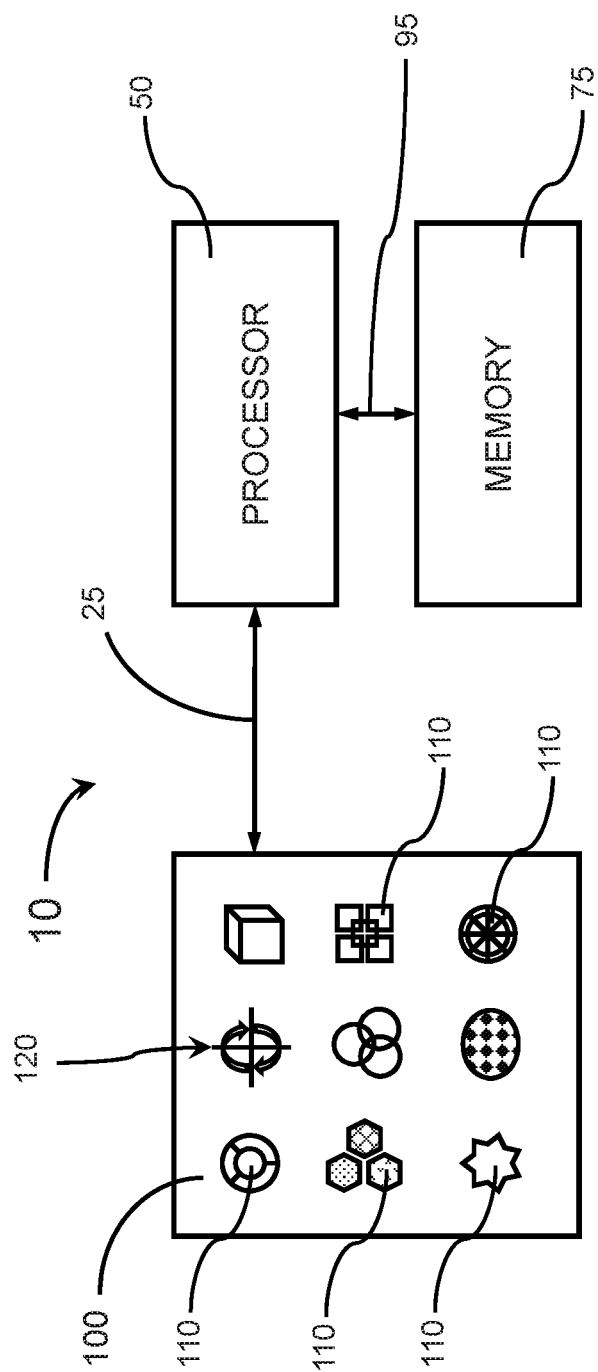
FIG. 24 is a block diagram of a system configured to facilitate selection of objects presented on a touch screen display in accordance with an illustrative embodiment.

Referring to FIG. 24, an embodiment of a system configured to facilitate selection of objects presented on a touch screen display is shown. The system 10 may include a touch screen display 100, a processor 50 coupled to the touch screen display 100, where the processor communicates with the touch screen display 100 over a communication path 25, and memory 75 coupled to processor 50, where the processor communicates with the memory 75 over a communication path 95.

In one or more embodiments, the processor may include a general computer processor, an application specific integrated circuit (ASIC), and/or programmable controllers, the memory may include ROM, RAM, FLASH, optical storage, and magnetic storage. Input components, output components, and additional components and circuitry may be incorporated into the device and in communication with the processor and memory to provide functionality and control features to the device. The program code may be incorporated into the system as hardware, software, and/or firmware, where the program code may be hardwired into the circuitry, or stored on a non-transient computer readable medium.

In various embodiments, default setting and/or user settings for the various selection modes may be stored in the memory 75 for use by the processor in displaying and/or rendering the digital images 110 having a set of characteristics, and/or floating icons.

In one or more embodiments, the system 10 may be incorporated into a smart watch, a smart phone, toys, consumer electronic devices, industrial electronic devices, etc.

In various embodiments, the touch screen display 100 may be a small touch screen display. The touch screen display may be configured to display digital images, and detect a user's interaction with the touch screen. The system may be configured to present an indicator associated with one of a plurality of digital images displayed on the touch screen display, and detect interaction with the touch screen display as selection of the one of the plurality of digital images associated with the indicator.

In various embodiments, the system may be configured to indicate one of the plurality of independent digital images is selectable by displaying a floating icon on the touch screen display associated with the one of the plurality of digital images; and transferring the floating icon from the indicated digital image to a subsequent digital image. In various embodiments, the system may be configured to indicate one of the plurality of independent digital images is selectable by altering a characteristic of the digital image.

Figure 25:
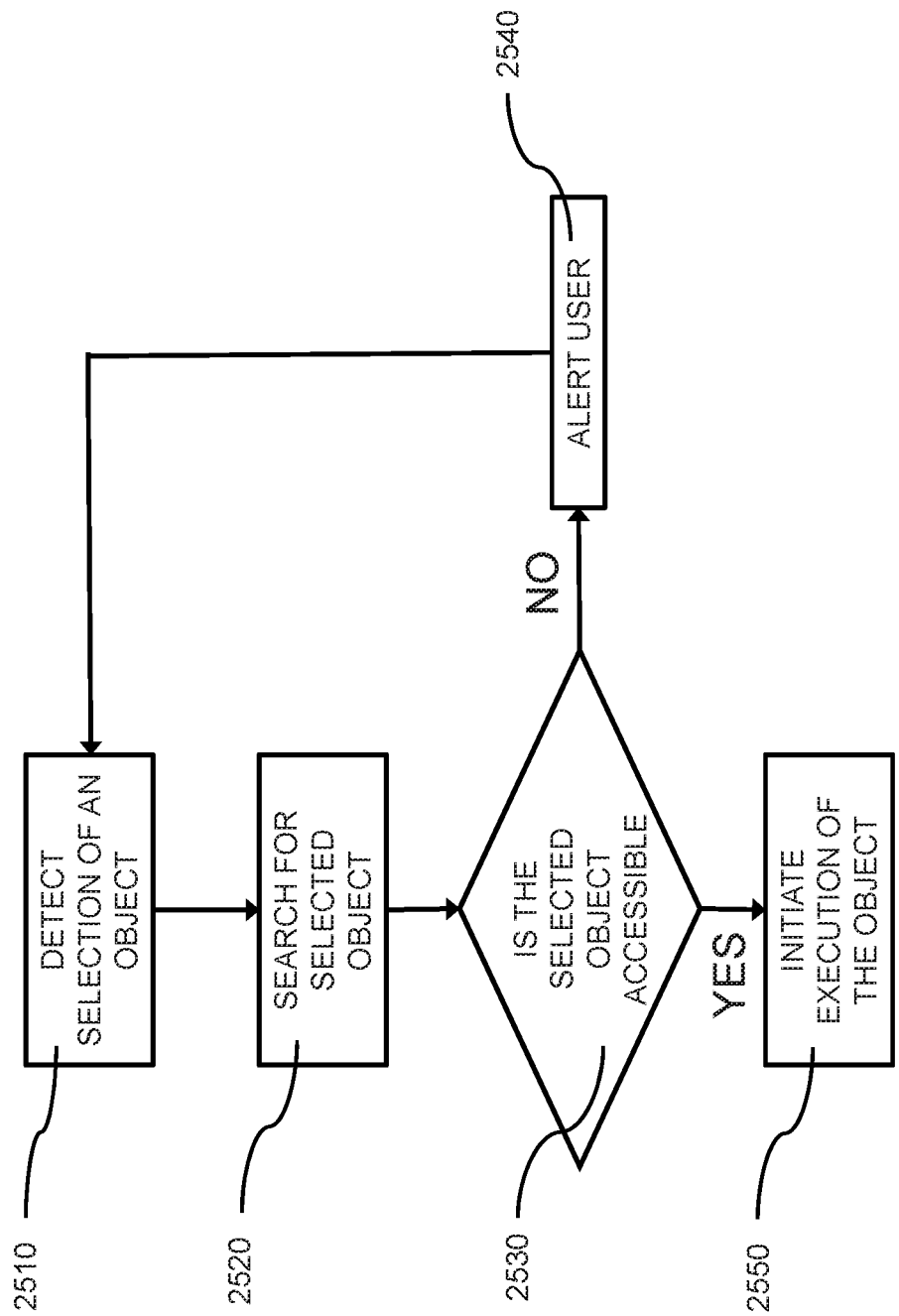
FIG. 25 is a block/flow diagram illustrating an embodiment of a process of selecting an object.

Referring to FIG. 25, a block/flow diagram illustrates an embodiment of a process of selecting an object. Selection of an object can initiate the execution of the application, transfer between applications, follow the hyperlink, accessing data, opening a file, etc. In various embodiments the application(s), hyperlink(s), data, file(s), etc., may be stored in the device memory, on a remote server, in the cloud, etc.

In block 2510, the processor detects the selection of an object.

In block 2520, the processor searches for and identifies the application, hyperlink, file, etc., corresponding to the selected object.

In block 2530, the processor determines if the object is accessible.

In block 2540, if the selected object is not available or accessible, the processor alerts the user, redisplays the set of digital images, and awaits selection of a new object.

In block 2550, the processor initiates the execution of the application, transfer between applications, following of the hyperlink, accessing data, opening a file, etc., as indicated by the object. The selected process is performed by the processor. A user may then interact with the executed application, hyperlink, etc.

After the function of the object has concluded, the processor redisplays the set of digital images on the touch screen and awaits another selection. For example, when the process ends, the touch screen reverts to an initial display of icons.

Figure 26:
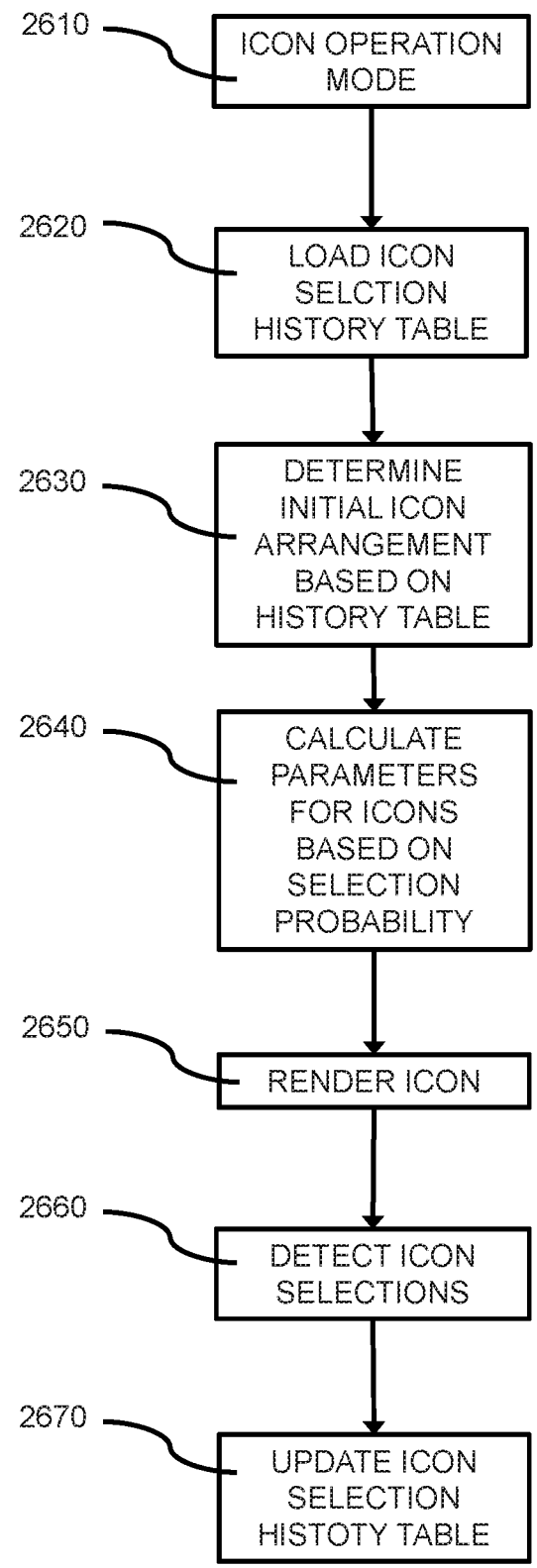
FIG. 26 is a block/flow diagram illustrating an embodiment of maintaining an icon selection history table.

Referring to FIG. 26, a block/flow diagram illustrates an embodiment of maintaining an icon selection history table. The selection histories for the objects may be stored and maintained in memory coupled to the processor. The icon selection history table may be accessed to determine the probability and/or frequency that each object is selected.

In block 2610, the icon operation mode is entered. Programming relating to input, storage, modification, and access may be executed by the processor to allow data entry into and data retrieval from the icon selection history table.

In block 2620, current data stored in the icon selection history table may be retrieved to determine the arrangement of digital images on a touch screen display, and the sequence, duration, and speed at which each of the plurality of independent digital images is indicated as selectable. Additional data relating to the characteristics of the digital images may be stored in the icon selection history table or in a separate table for displaying and changing the digital images.

In block 2630, one or more digital images is displayed on the touch screen display based on the data in the icon selection history table. For example, the digital images corresponding to the more frequently selected objects may be displayed in the upper left corner of the touch screen, and less frequently selected objects may be displayed in the lower right corner of the touch screen.

In block 2640, the rate of floating icon movement, duration of selectability, and the other characteristics dependent on the frequency or probability of selection are calculated by the processor for implementation during the selection modes.

In block 2650, the individual icons are displayed on the screen in the arrangement determined by the processor.

In block 2660, the processor enters icon selection mode to determine if an object corresponding to a digital image is selected. Selection of an object by a user can alter the frequency and probability data.

In block 2670, the updated data is updated and stored in the icon selection history table. The new data may be used to follow changing preferences by a user, and alter the histories of the objects. Changes to the icon selection history table may be reported to a user. At the conclusion of object selection, for example if the device is turned off, icon operation mode may be exited.

Figure 27:
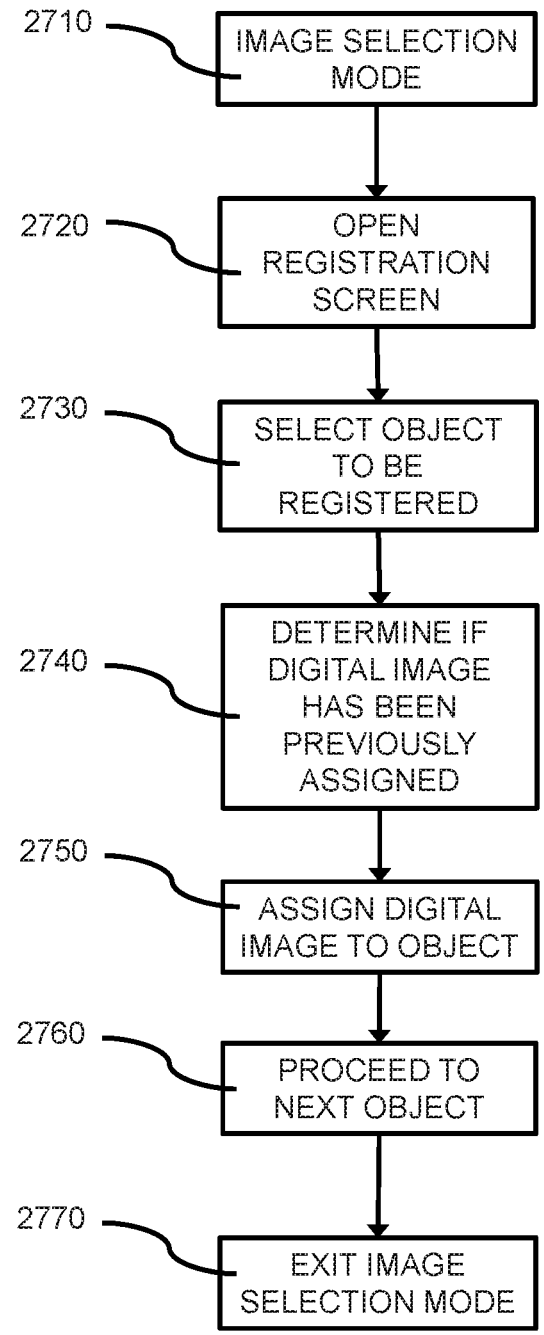
FIG. 27 is a block/flow diagram illustrating an embodiment of assigning a digital image to an object.

Referring to FIG. 27, a block/flow diagram illustrates an embodiment of assigning a digital image to an object. The digital images corresponding to the objects may be stored and maintained in memory coupled to the processor. The digital images may be stored in a table, and may be accessed to display a different image for each object that may be selected.

In block 2710, the image selection mode is entered. Programming relating to input, storage, modification, and access of the digital images may be executed by the processor to allow data entry into and data retrieval from memory and/or the digital image table.

In block 2720, a registration screen may be displayed, and current data stored for the digital images may be retrieved to determine which digital images are available for assignment to stored or accessible objects. Additional data relating to the characteristics of the digital images may be stored in the digital image table for displaying and changing the digital images.

In block 2730, an object to be assigned a digital image may be selected. The objects may be stored in memory or accessible from a remote system or the cloud.

In block 2740, a digital image is selected for assignment to the particular object. The processor may determine if the selected digital image has been previously assigned to a different object. If the selected digital image has been previously assigned, a user may be prompted to make a new selection.

In block 2750, if the selected digital image has not been previously assigned, the digital image is assigned to the currently selected object.

In block 2760, the processor proceeds to the next object requiring assignments of a digital image for display on the touch screen.

In block 2770, after all accessible objects have been assigned unique digital images, the image selection mode may be exited. If the device is turned off, image selection mode may be exited. An image assignment table may be saved to memory.

While embodiments relating to smart phones and smart watches have been illustrated, this should not be considered a limitation. The various embodiments encompassed by the scope of the claims may also be applied to devices having small touch screens including but not limited to automotive dashboards, industrial consoles, consumer products (e.g., coffee makers, vacuum cleaners, food processors, microwave ovens, etc.), personal computer games, copy machines, and electronic thermostats.

In various embodiments, the methods and systems may be incorporated as a feature that may be turned on and off by the user.

Having described preferred embodiments for an approach for selecting a desired object on a small touch screen (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method of selecting an object represented on a touch screen display, comprising:
    displaying a plurality of independent digital images on a small touch screen display having a dimension in a range of about 32 mm to about 140 mm across the diagonal, wherein the touch screen display is responsive to interaction with the touch screen, wherein each of the plurality of digital images is separated from other adjacent digital images by a space that is less than the average surface area of a contact point generated by a fingertip;
    indicating one of the plurality of independent digital images is selectable by displaying a floating icon associated with the one of the plurality of independent digital images;
    detecting if interaction with the touch screen display is made while the one of the plurality of independent digital images is indicated as selectable; and
    if interaction with the touch screen display is not made while the one of the plurality of independent digital images is indicated as selectable, indicating a subsequent digital image is selectable.

2. The method of claim 1, wherein the small touch screen display has a dimension in a range of about 33 mm to about 120 mm across the diagonal.

3. The method of claim 1, wherein the small touch screen display is a component of a smart watch.

4. The method of claim 3, wherein the floating icon is a pair of sliders.

5. The method of claim 4, further comprising executing an object associated with the digital image indicated as selectable if interaction with the touch screen is made while the digital image is indicated as selectable.

6. The method of claim 1, further comprising repeatedly transferring the floating icon from the indicated digital image to a subsequent digital image until contact with the touch screen display is detected while one of the plurality of independent digital images is indicated as selectable.

7. A system for facilitating selecting an object represented on a touch screen display, comprising:
    a small touch screen display having a dimension in a range of about 32 mm to about 140 mm across the diagonal configured to display a plurality of independent digital images, and detect a user's interaction with the screen, wherein each of the plurality of independent digital images is separated from other adjacent digital images by a space that is less than the average surface area of a contact point generated by a fingertip;
    indicating one of the plurality of independent digital images is selectable by displaying a floating icon associated with the one of the plurality of independent digital images;
    detecting if interaction with the touch screen display is made while the one of the plurality of independent digital images is indicated as selectable, wherein interaction with the touch screen display is detected as selection of the one of the plurality of digital images associated with the indicator; and
    if interaction with the touch screen display is not made while the one of the plurality of independent digital images is indicated as selectable, indicating a subsequent digital image is selectable.

8. The system of claim 7, further comprising a processor coupled to the touch screen display, and a memory coupled to the processor.

9. The system of claim 7, wherein the small touch screen display has a dimension in a range of about 33 mm to about 120 mm across the diagonal.

10. The system of claim 7, wherein the small touch screen display is a component of a smart watch.

11. The system of claim 10, further comprising repeatedly transferring the floating icon from the indicated digital image to a subsequent digital image until contact with the touch screen display is detected while one of the plurality of independent digital images is indicated as selectable.

12. The system of claim 11, wherein the floating icon is a pair of sliders.

13. A non-transitory computer useable storage medium comprising a computer readable program, wherein the computer readable program when executed on a computer causes the computer to:
    display a plurality of independent digital images on a small touch screen display having a dimension in a range of about 32 mm to about 140 mm across the diagonal, wherein the touch screen display is responsive to interaction with the touch screen, wherein each of the plurality of independent digital images is separated from other adjacent digital images by a space that is less than the average surface area of a contact point generated by a fingertip;
    indicate one of the plurality of independent digital images is selectable by displaying a floating icon associated with the one of the plurality of independent digital images;
    detect if interaction with the touch screen display is made while the one of the plurality of independent digital images is indicated as selectable; and
    if interaction with the touch screen display is not made while the one of the plurality of independent digital images is indicated as selectable, indicating a subsequent digital image is selectable.

14. The computer useable storage medium of claim 13, wherein the computer useable storage medium is a non-transitory computer readable storage medium.

15. The computer useable storage medium of claim 13, wherein the small touch screen display has a dimension in a range of about 33 mm to about 120 mm across the diagonal.

16. The computer useable storage medium of claim 13, wherein the small touch screen display is a component of a smart watch.

17. The computer useable storage medium of claim 13, wherein the floating icon is a pair of sliders.

* * * * *